US012607331B1

(12) United States Patent
Batteate

(10) Patent No.: US 12,607,331 B1
(45) Date of Patent: Apr. 21, 2026

(54) RECESSED LIGHTING ASSEMBLY MOUNTABLE UNDER ANY OBSTRUCTION

(71) Applicant: Ridgecrest Lightworks LLC, Brock, TX (US)

(72) Inventor: Henry Batteate, Livermore, CA (US)

(73) Assignee: Ridgecrest Lightworks LLC, Brock, TX (US)

( * ) Notice: Subject to any disclaimer, the term of this patent is extended or adjusted under 35 U.S.C. 154(b) by 0 days.

(21) Appl. No.: 19/032,048

(22) Filed: Jan. 18, 2025

(51) Int. Cl.
*F21V 21/04* (2006.01)
*F21S 8/02* (2006.01)

(52) U.S. Cl.
CPC .............. *F21V 21/04* (2013.01); *F21S 8/026* (2013.01)

(58) Field of Classification Search
CPC ...... F21V 21/04; F21S 8/026; F21Y 2105/18; F21Y 2115/10
See application file for complete search history.

(56) References Cited

U.S. PATENT DOCUMENTS

| | | | | |
|---|---|---|---|---|
| 10,900,654 | B1 * | 1/2021 | Nguyen | F21V 21/041 |
| 2017/0314750 | A1 * | 11/2017 | Feldman | F21V 17/162 |
| 2023/0100581 | A1 * | 3/2023 | Cohen | F21V 21/04 362/341 |
| 2024/0044462 | A1 * | 2/2024 | Kay | F21V 21/04 |
| 2024/0255128 | A1 * | 8/2024 | Hoffman | F21V 7/0058 |

OTHER PUBLICATIONS

'4" Trimless Floating Gimbal Downlight Installation Guide', Pamphlet, Date Unknown, p. 1, "www.maxximastyle.com", Maxxima, Hauppauge NY.

'2" and 4" Trimless Downlight Installation Guide', Pamphlet, Date Unknown, p. 1, "www.maxximastyle.com", Maxxima, Hauppauge NY.

'Recessed Downlight Trimless 5 Cct Change 4"', Pamphlet, Date Unknown, pp. 1-2, "www.allstarlighting.com", Luxrite, Avenel NJ.

'LED Spotlight-Canless 3" TRIMLESS', Pamphlet, Date Unknown, pp. 1-2, "www.luxrite.com", Luxrite.

(Continued)

*Primary Examiner* — Anne M Hines
*Assistant Examiner* — Jose M Diaz
(74) *Attorney, Agent, or Firm* — Adibi IP Group, PC; Amir V. Adibi; Andrew C. Palmer

(57) ABSTRACT

A recessed lighting assembly includes a drywall mounting apparatus and a light mounting apparatus. The drywall mounting apparatus has a mounting flange and a mounting body having a mounting depth that is one inch or less and is mountable under any obstruction. The drywall mounting apparatus allows for installation of the recessed lighting assembly in spaces with limited depth, while accommodating various types of obstructions that may be present above the drywall installation surface. In another embodiment, recessed lighting assembly includes a universal mounting apparatus and a light mounting apparatus. The universal mounting apparatus has a cylindrical, ring shape and has a mounting depth that is one inch or less and is mountable under any obstruction. The universal mounting apparatus allows for installation of the recessed lighting assembly in spaces with limited depth, while accommodating various types of obstructions that may be present above the substrate installation surface.

14 Claims, 22 Drawing Sheets

EXPLODED PERSPECTIVE VIEW OF RECESSED LIGHTING ASSEMBLY (ONE EMBODIMENT)

(56) References Cited

OTHER PUBLICATIONS

'3" Push and Lock Regressed Trimless Spotlight—5CCT Select', Pamphlet, Date Unknown, p. 1, "www.luxrite.com", Luxrite.
'4" 5 CCT Trimless Recessed Downlight', Pamphlet, Date Unknown, p. 1, "www.luxrite.com", Luxrite, Avenel NJ.
'4" Recessed Downlight', Pamphlet, Date Unknown, p. 1, https://invisabeamlight.com/products/invisabeam-where-elegance-meets-innovation, InvisaBeam.
'4" Recessed Downlight', Pamphlet, Date Unknown, pp. 1-2, "https://invisabeamlight.com/products/invisabeam-where-elegance-meets-innovation", InvisaBeam.
'4-Inch Ultra-thin LED Lens Downlight with Remote Driver / Junction Box', Pamphlet, Aug. 24, 2018, pp. 1-2, "www.eaton.com", Eaton, Peachtree City GA.
'HLB—4" and HLB—6" Series Instructions', Pamphlet, Date Unknown, pp. 1-7, "www.eaton.com", Eaton, Peachtree City GA.

* cited by examiner

EXPLODED PERSPECTIVE VIEW OF RECESSED LIGHTING ASSEMBLY (ONE EMBODIMENT)

PERSPECTIVE VIEW OF RECESSED LIGHTING ASSEMBLY AFTER INSTALLATION INTO DRYWALL

PERSPECTIVE VIEW OF DRYWALL MOUNTING APPARATUS

SIDE VIEW OF DRYWALL MOUNTING APPARATUS

FRONT VIEW OF DRYWALL MOUNTING APPARATUS

BACK VIEW OF DRYWALL MOUNTING APPARATUS

EXPLODED PERSPECTIVE VIEW OF RECESSED LIGHTING ASSEMBLY (ANOTHER EMBODIMENT)

PERSPECTIVE VIEW OF RECESSED LIGHTING
ASSEMBLY AFTER INSTALLATION INTO SUBSTRATE

PERSPECTIVE VIEW OF UNIVERSAL MOUNTING APPARATUS

SIDE VIEW OF UNIVERSAL MOUNTING APPARATUS

FRONT VIEW OF UNIVERSAL MOUNTING APPARATUS

BACK VIEW OF UNIVERSAL MOUNTING APPARATUS

PERSPECTIVE VIEW OF FRONT OF LIGHT MOUNTING APPARATUS

PERSPECTIVE VIEW OF BACK OF LIGHT MOUNTING APPARATUS

SIDE VIEW OF LIGHT MOUNTING APPARATUS

FRONT VIEW OF LIGHT MOUNTING APPARATUS

BACK VIEW OF LIGHT MOUNTING APPARATUS

CIRCUIT DIAGRAM

CONVENTIONAL RECESSED LIGHTING ASSEMBLY

PERSPECTIVE VIEW OF ANOTHER CONVENTIONAL
RECESSED LIGHTING ASSEMBLY

SIDE VIEW OF ANOTHER CONVENTIONAL
RECESSED LIGHTING ASSEMBLY

RECESSED LIGHTING ASSEMBLY MOUNTABLE UNDER ANY OBSTRUCTION

TECHNICAL FIELD

The present invention relates to recessed lighting assemblies, and more specifically to recessed lighting assemblies with shallow mounting apparatuses that can be installed under obstructions.

BACKGROUND INFORMATION

Recessed lighting has become increasingly popular in both residential and commercial settings due to its sleek, unobtrusive appearance and ability to provide focused illumination. These lighting fixtures are designed to be installed within a ceiling or wall, with the majority of the fixture concealed above or behind the surface, leaving only the trim and light source visible.

The installation process for recessed lighting typically involves cutting holes in the ceiling, mounting the housing, connecting the electrical wiring, and then installing the trim and light source. This process can be time-consuming and may require specialized tools and skills. Energy efficiency and heat management are also important considerations in recessed lighting design. Different building materials and construction methods may require specific mounting solutions to ensure secure and proper installation of the lighting fixtures.

SUMMARY

A recessed lighting assembly includes a drywall mounting apparatus and a light mounting apparatus. The drywall mounting apparatus has a mounting flange and a mounting body. The drywall mounting apparatus has a mounting depth that is one inch or less and is mountable under any obstruction. The drywall mounting apparatus allows for installation of the recessed lighting assembly in spaces with limited depth, while accommodating various types of obstructions that may be present above the drywall installation surface.

In another embodiment, recessed lighting assembly includes a universal mounting apparatus and a light mounting apparatus. The universal mounting apparatus has a cylindrical, ring shape. The universal mounting apparatus has a mounting depth that is one inch or less and is mountable under any obstruction. The universal mounting apparatus allows for installation of the recessed lighting assembly in spaces with limited depth, while accommodating various types of obstructions that may be present above the substrate installation surface.

In accordance with one novel aspect, various embodiments of the recessed lighting assembly allow for installation of lighting before, during, or after structural, electrical, plumbing, and other building related planning. The unique functionality of the recessed lighting assembly to be installed under any obstruction allows for lighting to be adapted or changed without concern for possible obstructions that may exist above the ceiling or on a side opposite a mounting side of a substrate.

The recessed lighting assembly provides a versatile and compact lighting solution designed for installation in various environments. Components of the recessed lighting assembly form a low-profile lighting system that can be installed in tight spaces and under various obstructions. The recessed lighting assembly offers several advantages over traditional lighting fixtures. Its compact design allows for installation in areas with limited space, such as under beams, ductwork, or other ceiling obstructions. This flexibility makes the assembly suitable for both new construction and retrofit applications.

In addition, the novel design allows for lighting to be placed anywhere, regardless of framing, ducting, electrical, plumbing, or other building plans. Even if building plans change, the recessed lighting assembly is mountable along any surface due to its novel structure and features. The recessed lighting assembly's low-profile design enables it to be installed flush with the mounting surface, creating a sleek and modern appearance. This feature is particularly beneficial in spaces with low ceilings or where a minimalist aesthetic is desired.

Additionally, the recessed lighting assembly is engineered for easy installation and maintenance. The components are designed to fit together seamlessly, reducing installation time and complexity. The assembly also allows for easy access to the lighting components for replacement or upgrades, enhancing its long-term usability and value.

The versatility of the recessed lighting assembly extends to its compatibility with various lighting technologies. The light mounting apparatus accommodates different types of lighting devices, allowing users to choose the most appropriate lighting solution for their specific needs and preferences. The recessed lighting assembly provides a flexible, efficient, and aesthetically pleasing lighting solution that addresses common installation challenges while offering superior functionality and design.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
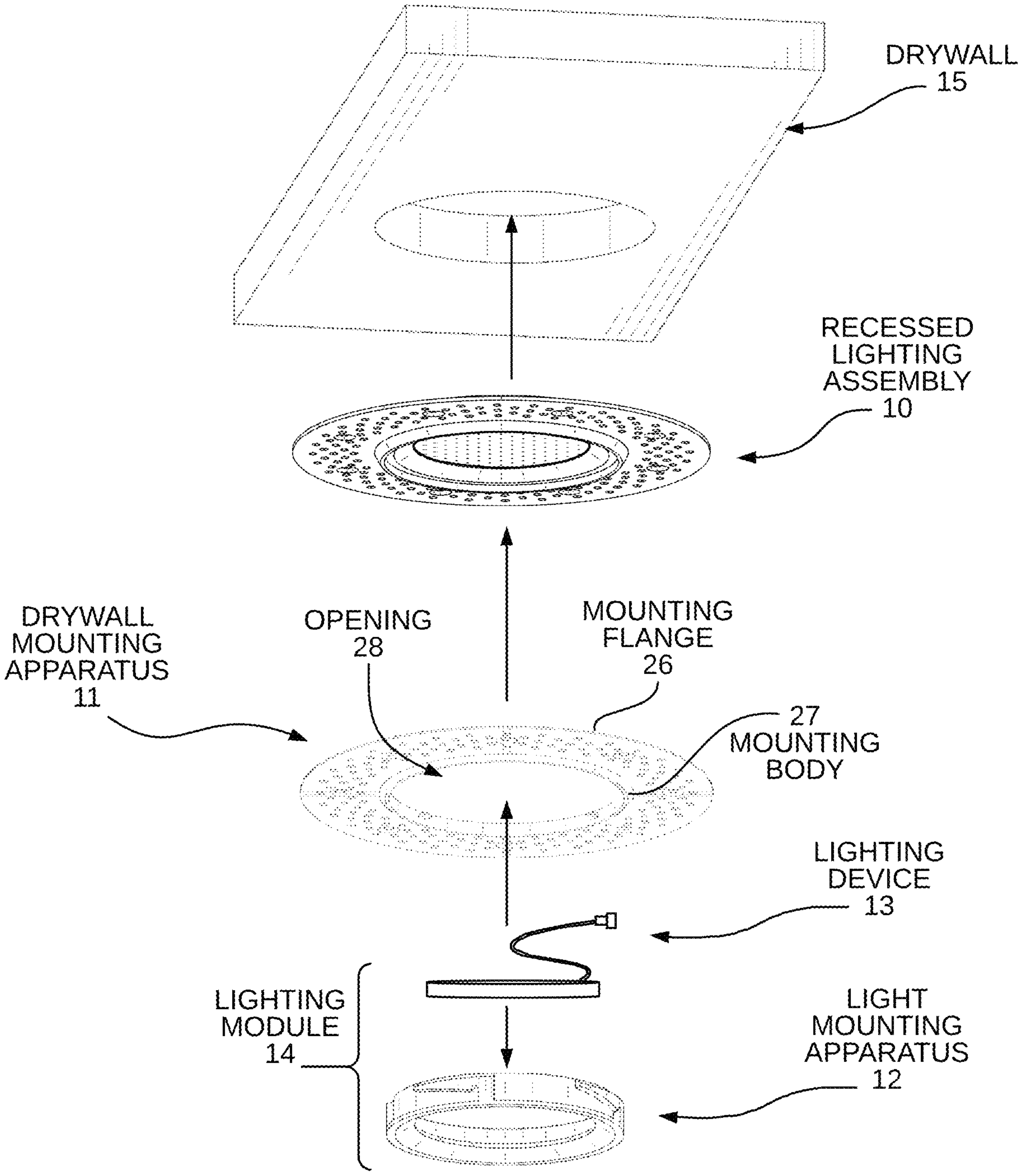
FIG. 1 is a diagram showing an exploded perspective view of a recessed lighting assembly in accordance with one embodiment.

FIG. 1 is a diagram showing an exploded perspective view of a recessed lighting assembly 10 in accordance with one embodiment. The recessed lighting assembly 10 comprises several components designed to work together for installation in a drywall 15 surface.

A drywall mounting apparatus 11 forms the base of the recessed lighting assembly 10. The drywall mounting apparatus 11 includes a circular mounting flange 26 and a mounting body 27. The mounting body 27 defines a central opening 28. The mounting flange 26 is designed to sit flush against the drywall 15 surface when installed. The drywall mounting apparatus 11 serves as the primary interface between the recessed lighting assembly 10 and the drywall 15, providing stability and support for the other components.

In accordance with one novel aspect, the mounting body 27 has a mounting depth 24 (see FIG. 4) that is less than a drywall thickness. In one example, the mounting depth 24 is less than one inch. In another example, the mounting depth 24 is less than one-fifteenth of an outer diameter 21 (see FIG. 3). In another example, the mounting depth 24 is less than one-tenth of the outer diameter 21. These novel relative dimensions ensure optimal functionality and structural integrity of the recessed lighting assembly while maintaining visual appeal.

A light mounting apparatus 12 is designed to fit within the central opening 28 of the drywall mounting apparatus 11. The light mounting apparatus 12 is a circular structure with a central opening 28, smaller in diameter than the drywall mounting apparatus 11. The light mounting apparatus 12 is configured to securely hold a lighting device 13 in place within the recessed lighting assembly 10.

The lighting device 13 is a circular unit designed to fit into the light mounting apparatus 12. The lighting device 13 includes the necessary electrical components to produce light when powered. In one embodiment, the lighting device 13 is a light-emitting diode (LED) module. In another embodiment, the lighting device 13 is a halogen bulb. In yet another embodiment, the lighting device 13 is a compact fluorescent lamp. In still yet another embodiment, the lighting device 13 is a solid-state lighting (SSL) device.

The light mounting apparatus 12 and the lighting device 13 together form a lighting module 14. This modular design allows for easy installation and replacement of the lighting components without disturbing the drywall mounting apparatus 11 or the surrounding drywall 15.

The recessed lighting assembly 10 is designed to be installed in an opening cut into the drywall 15. The drywall mounting apparatus 11 is first secured to the drywall 15, with its mounting flange 26 sitting flush against the drywall surface. The lighting module 14, comprising the light mounting apparatus 12 and the lighting device 13, is then inserted into the central opening of the drywall mounting apparatus 11. This configuration allows the recessed lighting assembly 10 to sit flush with the drywall 15 surface, providing a sleek and integrated appearance.

The modular nature of the recessed lighting assembly 10 allows for easy maintenance and upgrades. The lighting module 14 can be removed and replaced without disturbing the drywall mounting apparatus 11 or the surrounding drywall 15, simplifying the process of changing or upgrading the lighting device 13.

Figure 2:
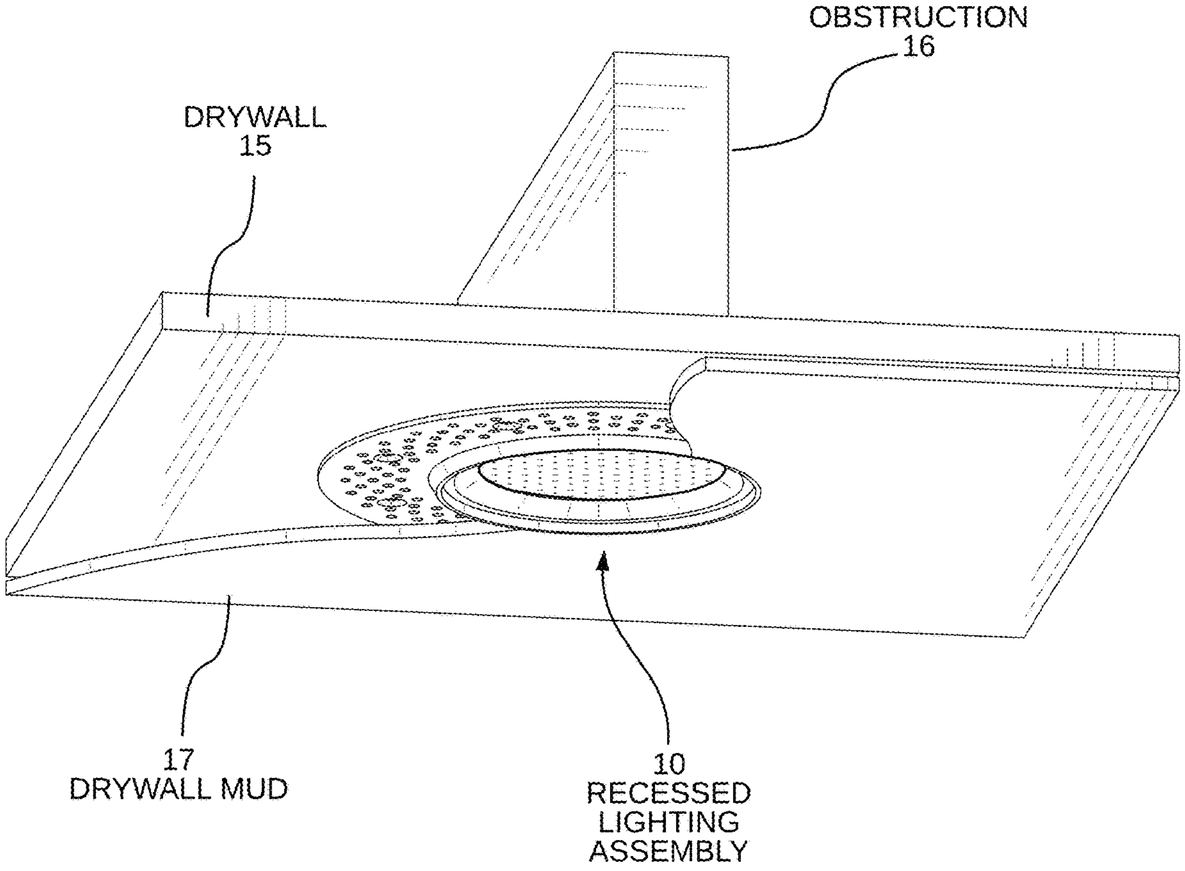
FIG. 2 is a diagram showing a perspective view of the recessed lighting assembly installed in drywall.

FIG. 2 is a diagram showing a perspective view of the recessed lighting assembly 10 after installation into the drywall 15. The recessed lighting assembly 10 is designed to be installed in various environments, including those with potential obstructions. In this example, an obstruction 16 is shown protruding from the upper portion of the drywall 15. The obstruction 16 represents any structural element that contacts a surface of the drywall 15 and potentially interferes with the installation of traditional recessed lighting fixtures. In one embodiment, the obstruction 16 is a framing member. In another embodiment, the obstruction 16 is a duct. In another embodiment, the obstruction 16 is a plumbing pipe. In another embodiment, the obstruction 16 is an electrical conduit.

The drywall mounting apparatus 11 is designed to be mountable under any obstruction, such as the obstruction 16. The low profile of the drywall mounting apparatus 11 allows for installation in spaces with limited clearance above the drywall 15. This feature enables the recessed lighting assembly 10 to be installed in locations where traditional recessed lighting fixtures would not fit. The recessed lighting assembly 10 yields ease of installation and design because the recessed lighting assembly 10 is installable along any surface regardless of obstructions. Even if building plans evolve, the recessed lighting assembly 10 is installable anywhere.

The light mounting apparatus 12 is securely attached to the drywall mounting apparatus 11, forming a stable base for the lighting device 13. The lighting module 14, comprising the light mounting apparatus 12 and the lighting device 13, fits within the interior of the drywall mounting apparatus 11, creating a compact and integrated lighting solution.

Drywall mud 17 is applied around the perimeter of the recessed lighting assembly 10. The drywall mud 17 serves multiple purposes in the installation process. First, the drywall mud 17 creates a smooth transition between the recessed lighting assembly 10 and the surrounding drywall 15, ensuring a seamless and professional finish. Second, the drywall mud 17 helps to conceal any gaps or imperfections in the installation, further enhancing the integrated appearance of the recessed lighting assembly 10.

The application of the drywall mud 17 is facilitated by the design of the drywall mounting apparatus 11. The mounting flange 26 of the drywall mounting apparatus 11 provides a surface for the drywall mud 17 to adhere to, allowing for a clean and precise finish around the recessed lighting assembly 10.

The versatility of the recessed lighting assembly 10 in accommodating different obstructions makes the assembly suitable for a wide range of applications, from residential to commercial settings. The ability to install the recessed lighting assembly 10 under obstructions and in various substrates provides flexibility in lighting design and placement, allowing for optimal illumination in challenging spaces.

Figure 3:
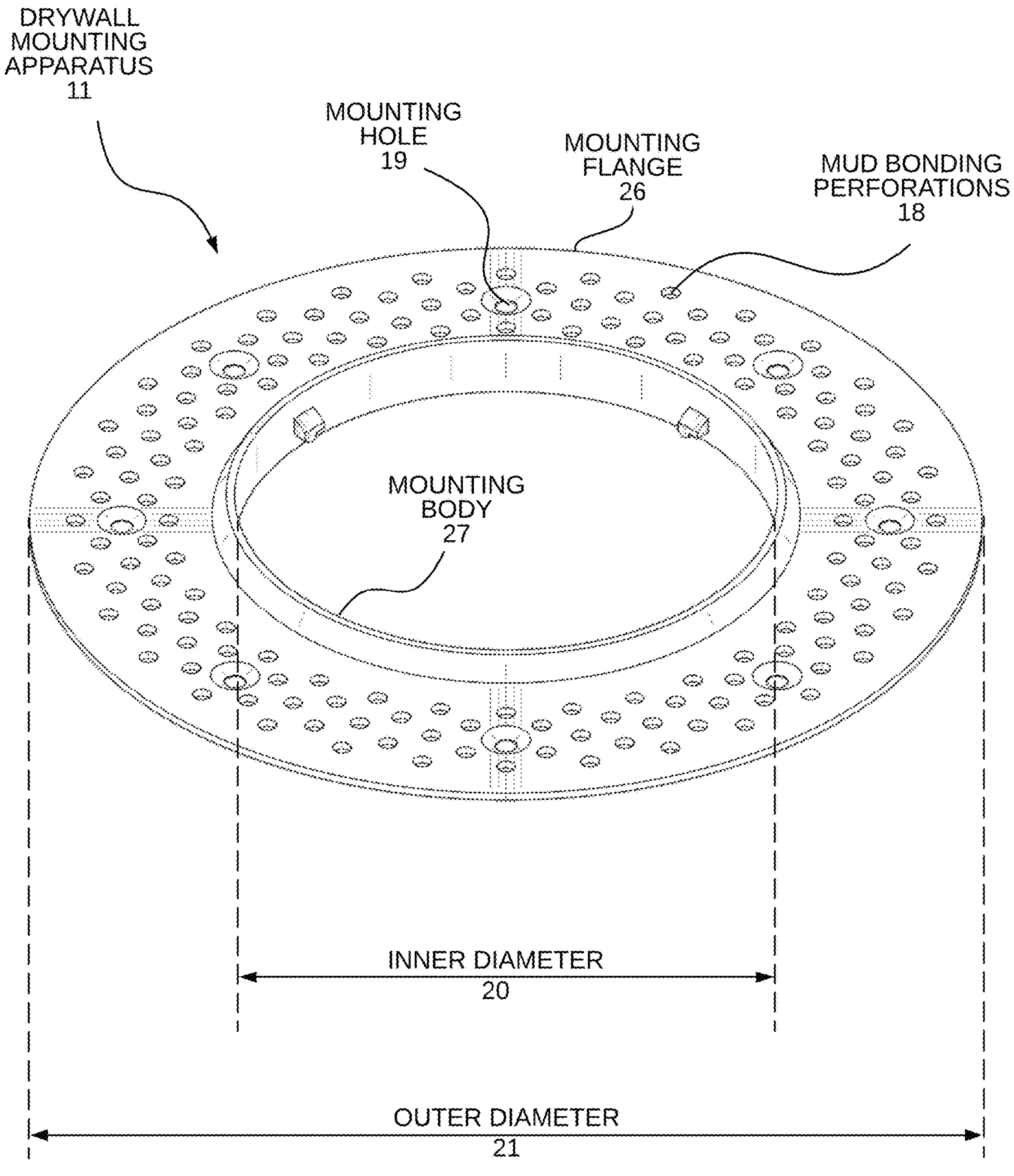
FIG. 3 is a diagram showing a perspective view of a drywall mounting apparatus.

FIG. 3 is a diagram showing a perspective view of the drywall mounting apparatus 11. The drywall mounting apparatus 11 includes the mounting flange 26 and the mounting body 27. The mounting flange 26 defines an outer diameter 21. The mounting body 27 defines an inner diameter 20. The mounting flange 26 has a plurality of perforations 18 and mounting holes 19.

The perforations 18 are small openings distributed across front and back surfaces of the mounting flange 26. In one embodiment, the perforations 18 are circular holes. In another embodiment, the perforations 18 are elongated slots. In another embodiment, the perforations 18 are a combination of shapes. The perforations 18 serve as mud bonding perforations, enhancing the adhesion between the drywall mounting apparatus 11 and the drywall mud 17.

The mounting holes 19 are larger openings positioned at intervals around the mounting flange 26. In one embodiment, the mounting holes 19 are circular. In another embodiment, the mounting holes 19 are elongated slots. In another embodiment, the mounting holes 19 are keyhole-shaped. The mounting holes 19 allow for secure attachment of the drywall mounting apparatus 11 to the drywall 15 or other substrate.

Figure 4:
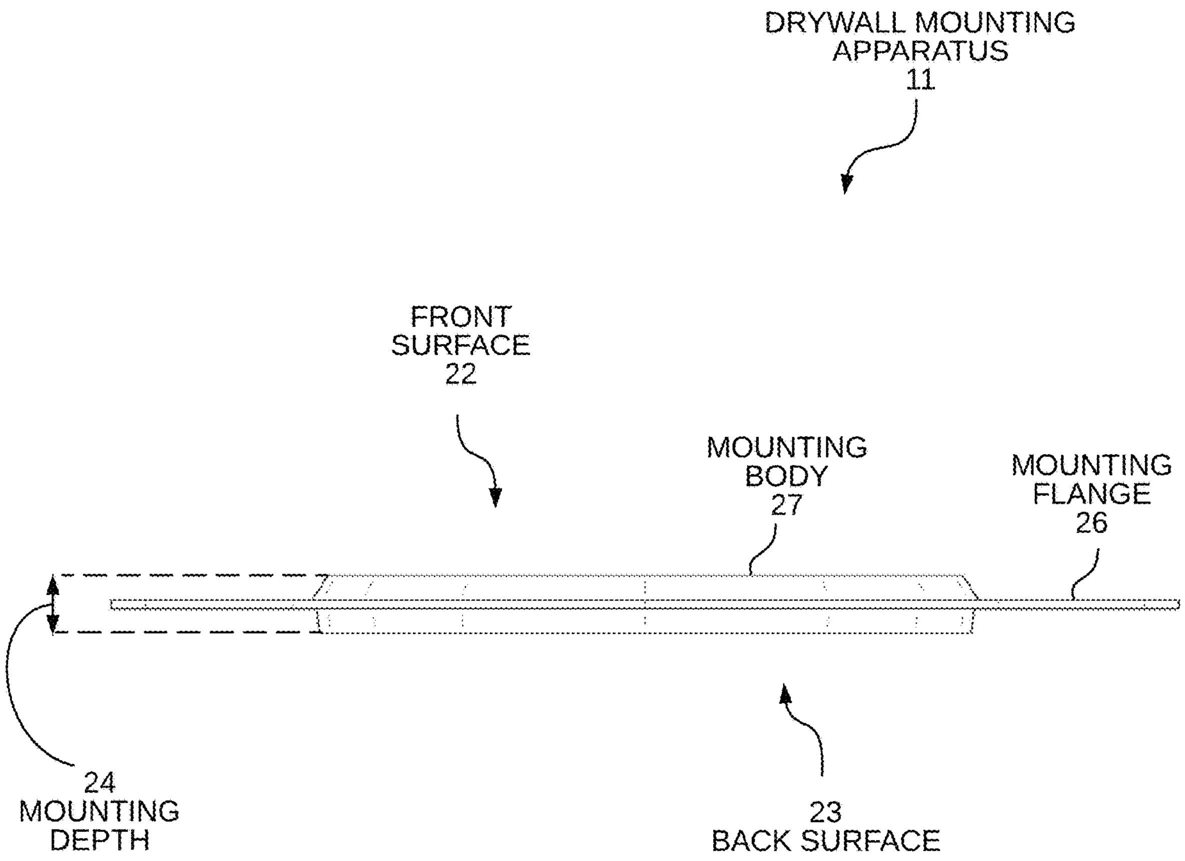
FIG. 4 is a diagram showing a side view of the drywall mounting apparatus.

FIG. 4 is a diagram showing a side view of the drywall mounting apparatus 11. The drywall mounting apparatus 11 includes a front surface 22 and a back surface 23. The front surface 22 faces outward when the drywall mounting apparatus 11 is installed, while the back surface 23 attaches to the drywall 15.

The distance between the front surface 22 and the back surface 23 defines a mounting depth 24 of the drywall mounting apparatus 11. In one embodiment, the mounting depth 24 is one inch or less. In another embodiment, the mounting depth 24 is three-quarters of an inch. In another embodiment, the mounting depth 24 is half an inch. In another embodiment, the mounting depth 24 is less than one-fifteenth of the outer diameter 21. In another example, the mounting depth 24 is less than one-tenth of the outer diameter 21. The shallow mounting depth 24 relative to the outer diameter 21 allows the drywall mounting apparatus 11 to be installed in spaces with limited clearance, such as under the obstruction 16, without compromising structural integrity of the installed lighting assembly.

Figure 5:
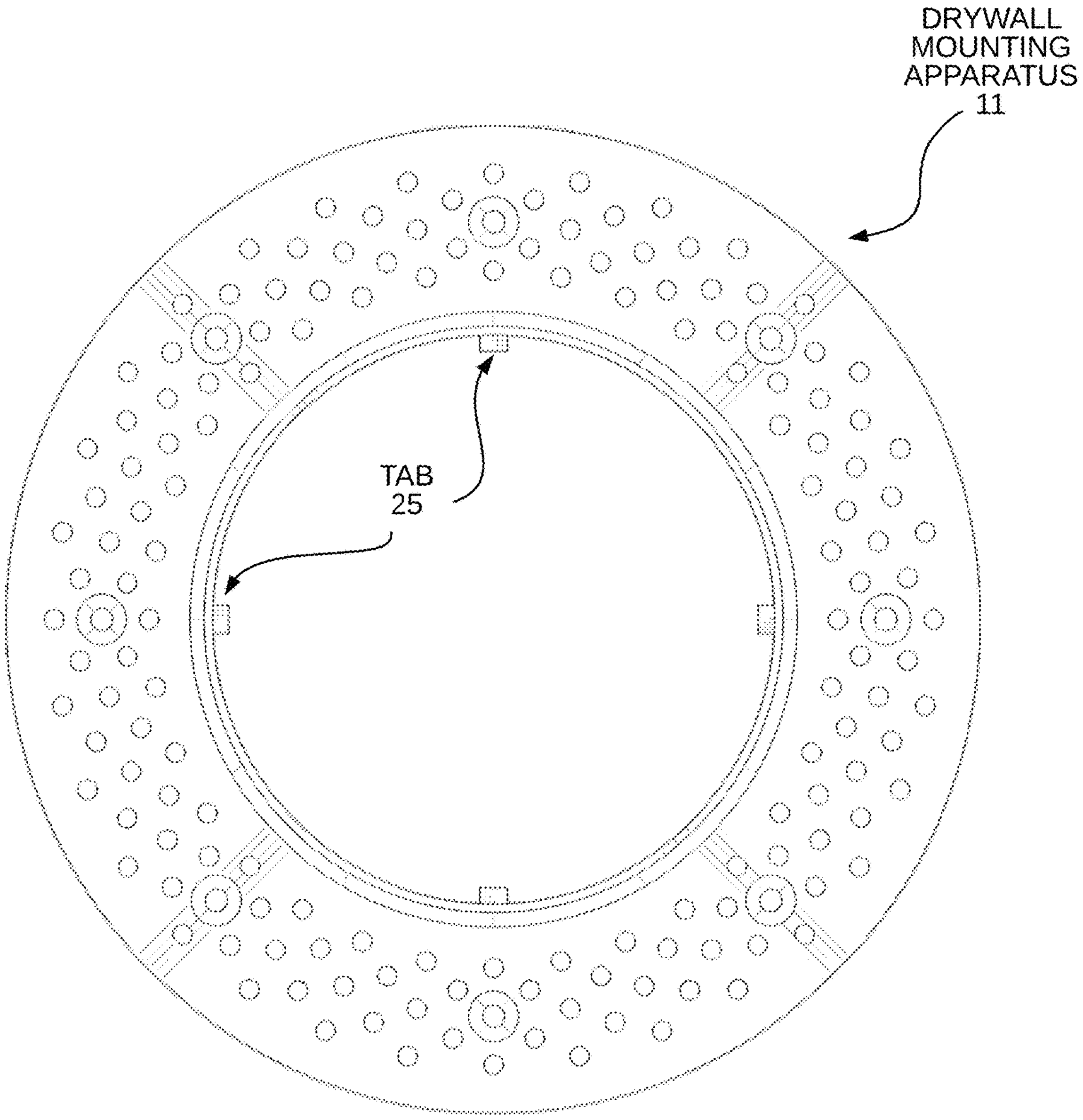
FIG. 5 is a diagram showing a front view of the drywall mounting apparatus.

FIG. 5 is a diagram showing a front view of the drywall mounting apparatus 11. The drywall mounting apparatus 11 includes engagement tabs 25 positioned around the inner diameter 20. In one embodiment, the engagement tabs 25 are rectangular protrusions. In another embodiment, the engagement tabs 25 are curved protrusions. In another embodiment, the engagement tabs 25 are L-shaped protrusions. The engagement tabs 25 are designed to interact with corresponding features on the light mounting apparatus 12, securing the light mounting apparatus 12 within the drywall mounting apparatus 11. In various embodiments, the light mounting apparatus 12 secures to the drywall mounting apparatus 11 via twist action, clip, hook and loop fastener, press fit, adhesive, magnetic, or other type of mechanical attachment.

Figure 6:
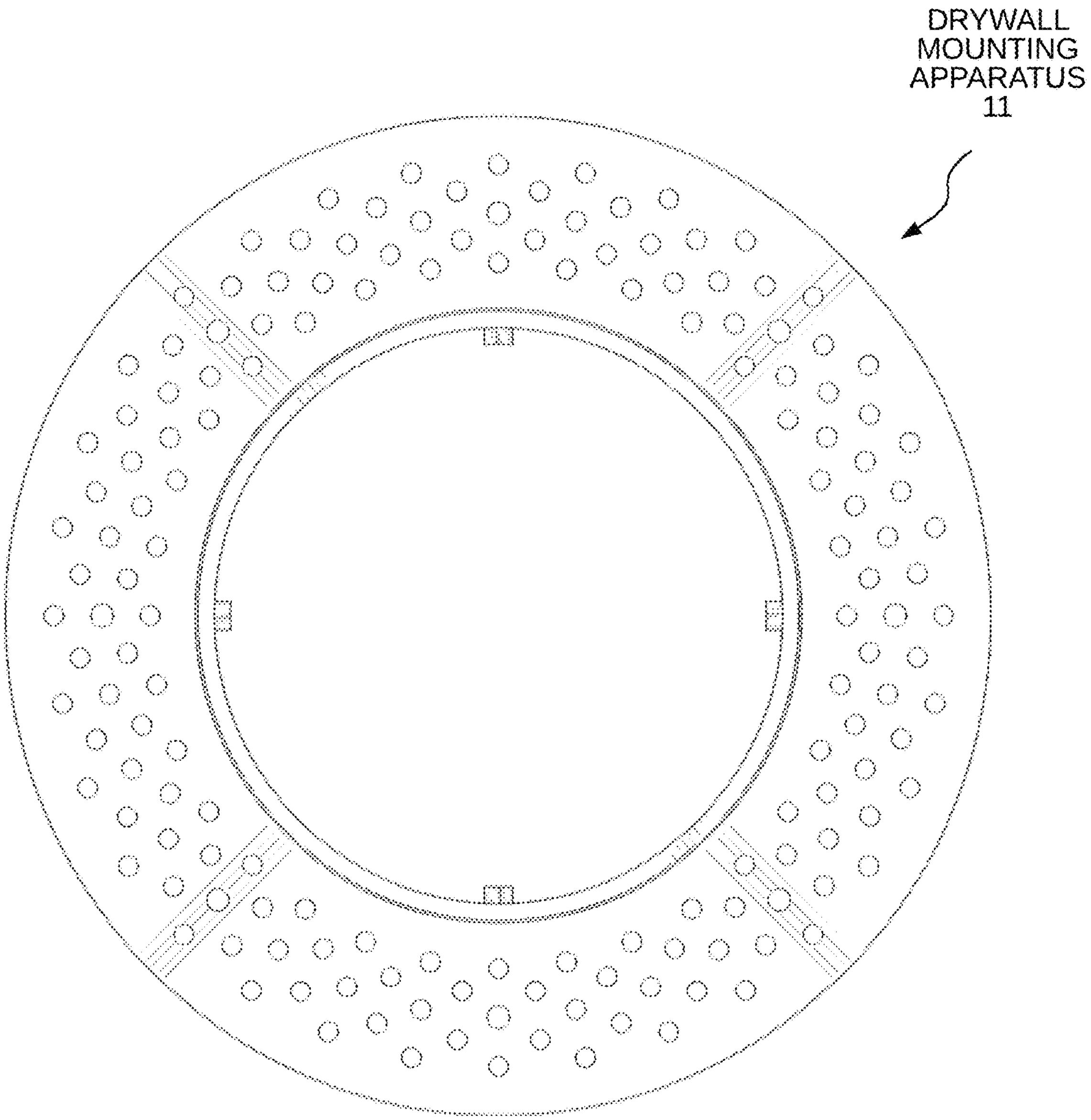
FIG. 6 is a diagram showing a back view of the drywall mounting apparatus.

FIG. 6 is a diagram showing a back view of the drywall mounting apparatus 11. The back view provides a clear illustration of the mounting body, which has an inner surface and an outer surface. The inner surface is configured to receive the light mounting apparatus 12. The outer surface interfaces with the drywall 15 or other substrate when installed.

The drywall mounting apparatus 11 is designed to accommodate various installation scenarios. The back surface 23 attaches directly to the drywall 15, providing a stable base for the recessed lighting assembly 10. The front surface 22 is configured to receive the drywall mud 17, allowing for a seamless integration with the surrounding drywall 15 surface.

The combination of the perforations 18, mounting holes 19, and the shallow mounting depth 24 allows the drywall mounting apparatus 11 to be securely installed in a variety of substrates while maintaining a low profile. This design enables the recessed lighting assembly 10 to be mounted under the obstruction 16, providing flexibility in lighting placement and design.

Figure 7:
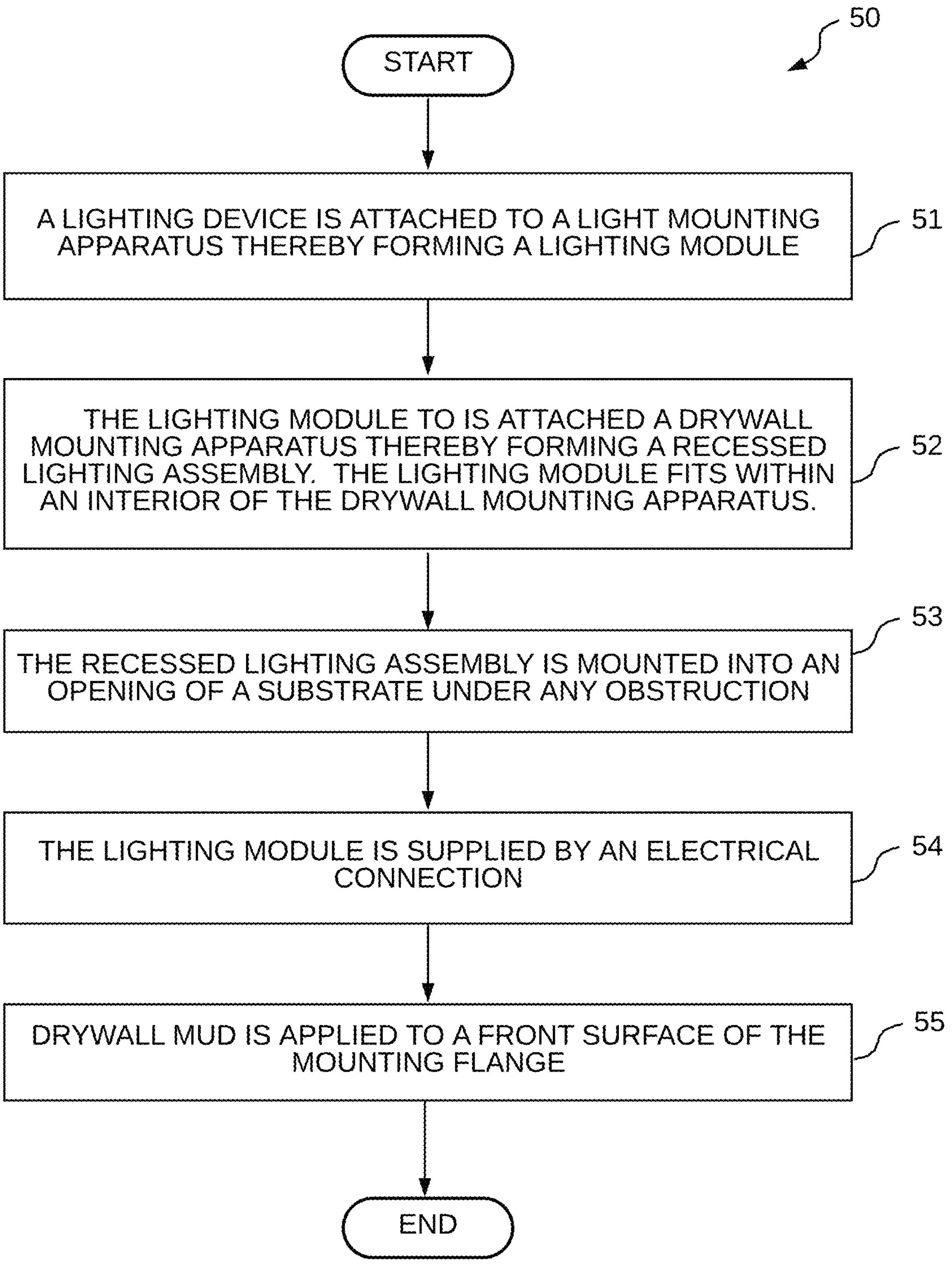
FIG. 7 is a flowchart of a method in accordance with one novel aspect.

FIG. 7 is a diagram showing a flowchart of a method 50 for installing and operating the recessed lighting assembly 10 in a drywall surface. The method 50 comprises a series of steps for assembling and mounting the recessed lighting assembly.

In a first step (step 51), a lighting device is attached to a light mounting apparatus, thereby forming a lighting module. This step involves securing the lighting device within the light mounting apparatus to create a single unit that can be easily installed and removed as needed.

In a second step (step 52), the lighting module is attached to a drywall mounting apparatus, thereby forming a recessed lighting assembly. During this step, the lighting module fits within an interior of the drywall mounting apparatus. The drywall mounting apparatus provides a stable base for the lighting module and interfaces with the surrounding drywall or other substrate.

In a third step (step 53), the recessed lighting assembly is mounted into an opening of a substrate under any obstruction. This step involves positioning the recessed lighting assembly within a pre-cut opening in the substrate, such as drywall. The drywall mounting apparatus has a mounting depth that is less than or equal to the thickness of the substrate, allowing for installation in spaces with limited clearance above the substrate surface.

In a fourth step (step 54), the lighting module is supplied with power via an electrical connection. This step involves connecting the lighting device to a power source, enabling the recessed lighting assembly to function as intended.

In a fifth step (step 55), drywall mud is applied to a front surface of the mounting flange of the drywall mounting apparatus. The drywall mud creates a smooth transition between the recessed lighting assembly and the surrounding substrate surface, providing a seamless and professional finish.

The perforations on the mounting flange of the drywall mounting apparatus enhance the adhesion of the drywall mud, ensuring a secure bond between the recessed lighting assembly and the substrate. The inner diameter and outer diameter of the drywall mounting apparatus are designed to accommodate the lighting module while providing sufficient surface area for secure mounting and finishing.

The mounting depth of the drywall mounting apparatus allows for installation under various obstructions, such as framing members, ducts, plumbing pipes, or electrical conduits. This feature provides flexibility in lighting placement and design, enabling the recessed lighting assembly to be installed in challenging spaces where traditional recessed lighting fixtures would not fit.

Figure 8:
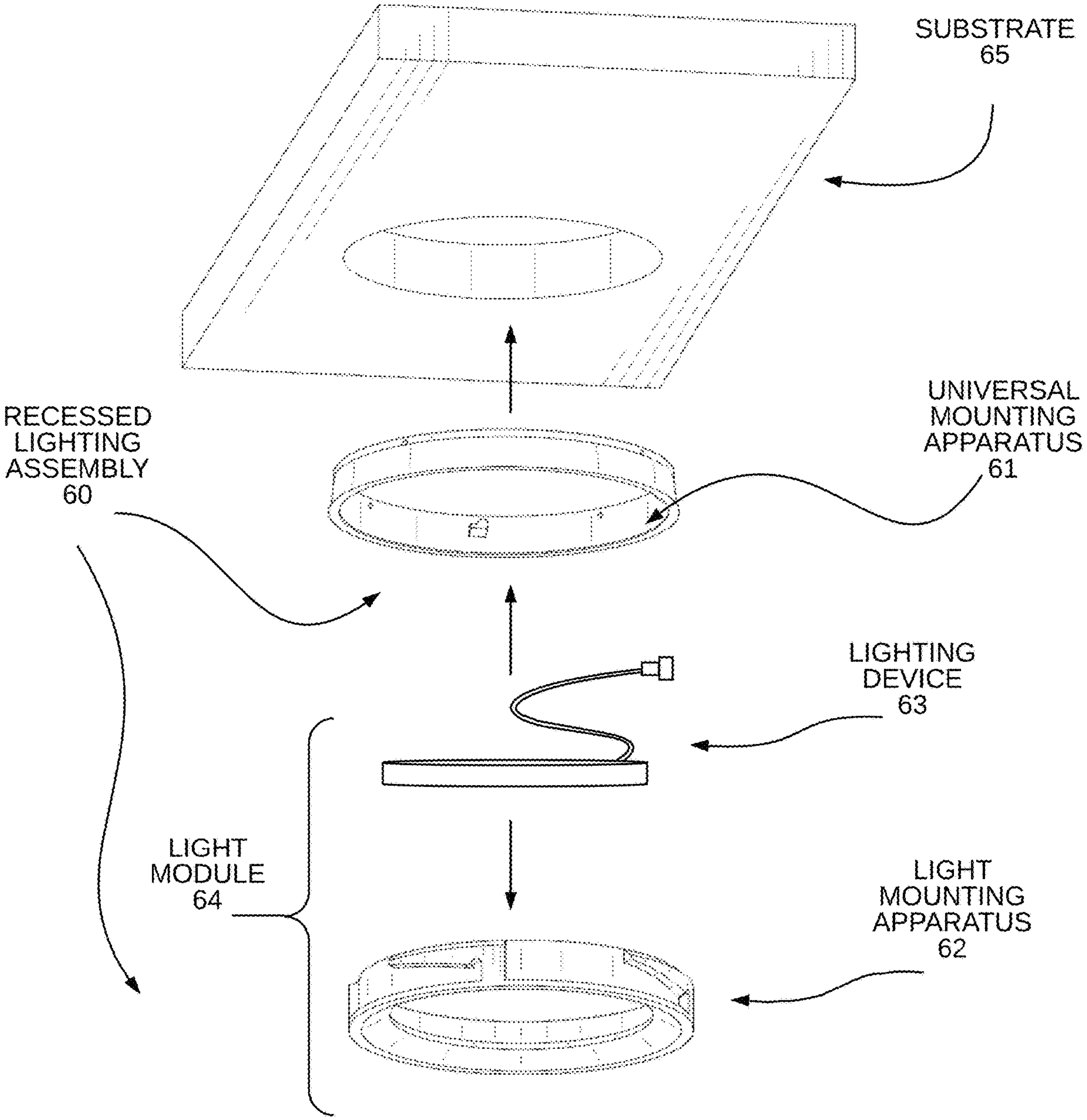
FIG. 8 is a diagram showing an exploded perspective view of a recessed lighting assembly in accordance with another embodiment.

FIG. 8 is a diagram showing an exploded perspective view of a recessed lighting assembly 60 in accordance with another embodiment. The recessed lighting assembly 60 comprises a universal mounting apparatus 61, a light mounting apparatus 62, and a lighting device 63. The universal mounting apparatus 61 is designed to be mounted onto a substrate 65. The universal mounting apparatus 61 has a cylindrical, ring shape with an inner surface and an outer surface.

In accordance with one novel aspect, universal mounting apparatus 61 has a mounting depth 69 (see FIG. 11) that is less than a thickness of substrate 65. In one embodiment, the universal mounting apparatus 61 has a mounting depth 69 that is one inch or less. In another embodiment, the mounting depth 69 is three-quarters of an inch. In another embodiment, the mounting depth 69 is half an inch. In another example, the mounting depth 69 is less than one-eighth of the outer diameter 70 (see FIG. 12). These novel dimensions ensure optimal functionality and structural integrity of the recessed lighting assembly while maintaining visual appeal. The shallow mounting depth allows the universal mounting apparatus 61 to be installed in spaces with limited clearance, such as under an obstruction.

The light mounting apparatus 62 is configured to fit into the universal mounting apparatus 61. The lighting device 63 is designed to fit into the light mounting apparatus 62. The light mounting apparatus 62 and the lighting device 63 together form a light module 64. This modular design allows for easy installation and replacement of the lighting components without disturbing the universal mounting apparatus 61 or the surrounding substrate 65.

Figure 9:
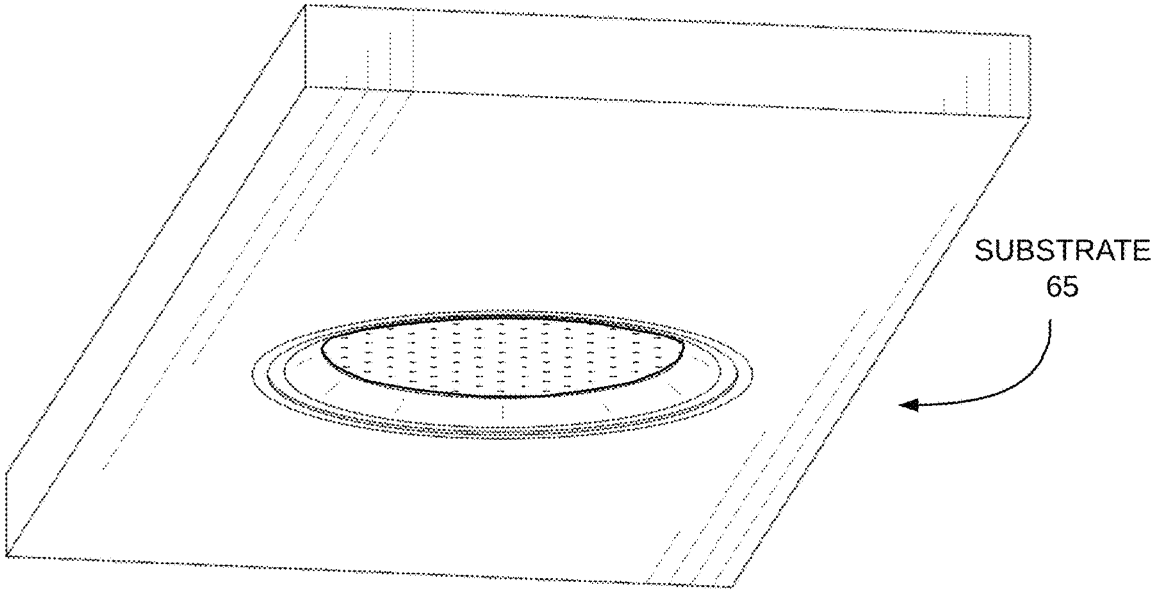
FIG. 9 is a diagram showing a perspective view of the recessed lighting assembly installed in a substrate.

FIG. 9 is a diagram showing a perspective view of the recessed lighting assembly installed in a substrate. The universal mounting apparatus 61 is mountable onto any substrate 65. In one embodiment, the substrate 65 is a wood panel. In another embodiment, the substrate 65 is a tile surface. In another embodiment, the substrate 65 is a metal ceiling. In another embodiment, the substrate 65 is a plastic panel. In another embodiment, the substrate 65 is part of a vent or register. In another embodiment, the substrate 65 is part of a wall. In another embodiment, the substrate 65 is any suitable building structure capable of supporting the recessed lighting assembly 60.

Figure 10:
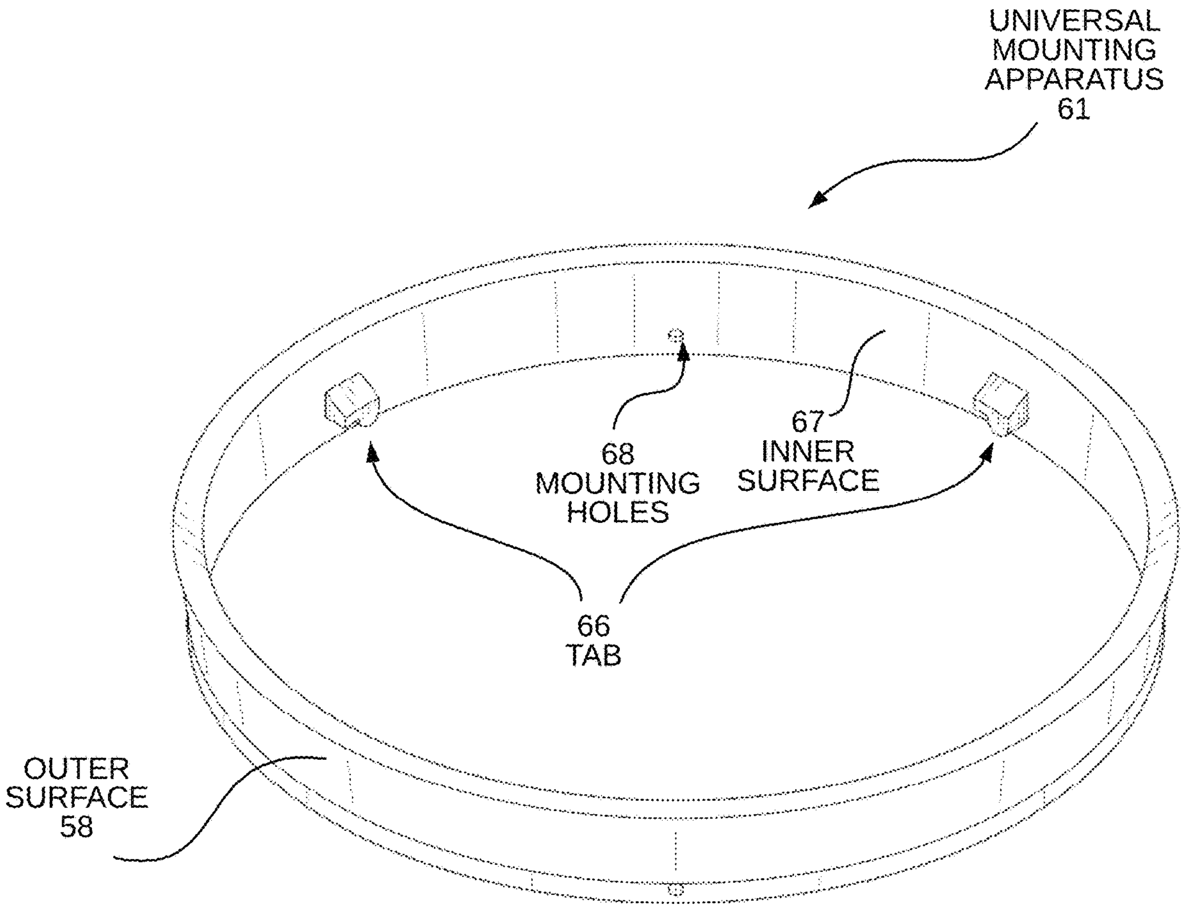
FIG. 10 is a diagram showing a perspective view of a universal mounting apparatus.

FIG. 10 is a diagram showing a perspective view of the universal mounting apparatus 61. The universal mounting apparatus 61 includes an outer surface 58 and an inner surface 67. The inner surface 67 is configured to receive the light mounting apparatus 62.

The universal mounting apparatus 61 features several tabs 66 positioned around the inner surface 67. In one embodiment, the tabs 66 are rectangular protrusions. In another embodiment, the tabs 66 are curved protrusions. In another embodiment, the tabs 66 are L-shaped protrusions. The tabs 66 are designed to interact with corresponding features on the light mounting apparatus 62, securing the light mounting apparatus 62 within the universal mounting apparatus 61. In various embodiments, the light mounting apparatus 62 secures to the universal mounting apparatus 61 via twist action, clip, hook and loop fastener, press fit, adhesive, magnetic, or other type of mechanical attachment.

The universal mounting apparatus 61 includes several mounting holes 68 positioned at intervals around its circumference. In one embodiment, the mounting holes 68 are circular. In another embodiment, the mounting holes 68 are elongated slots. In another embodiment, the mounting holes 68 are keyhole-shaped. The mounting holes 68 allow for secure attachment of the universal mounting apparatus 61 to the substrate 65.

Figure 11:
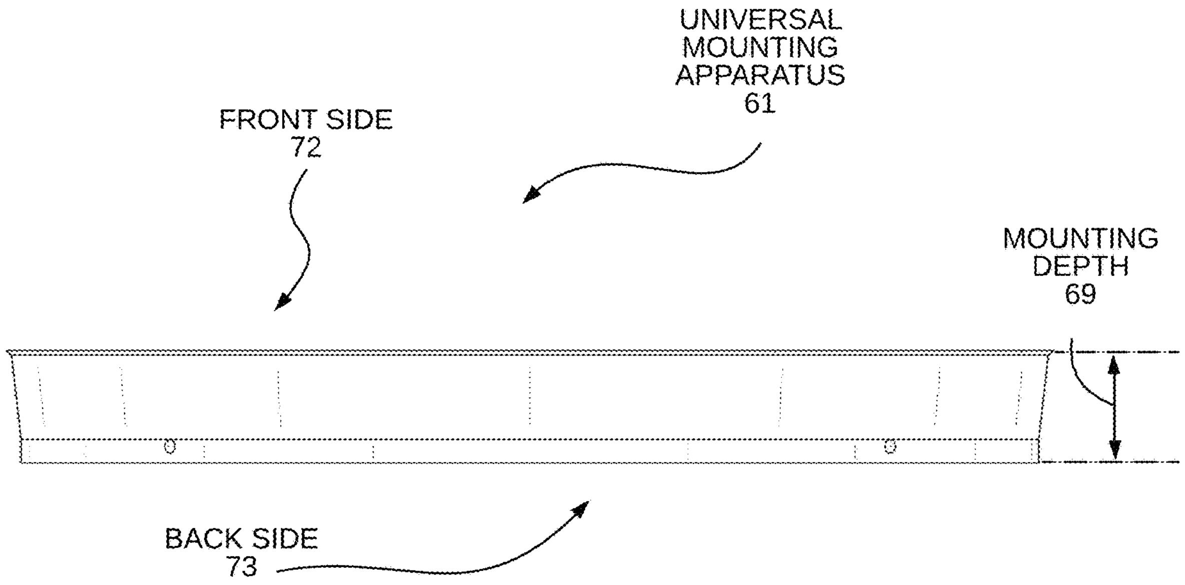
FIG. 11 is a diagram showing a side view of the universal mounting apparatus.

FIG. 11 is a diagram showing a side view of the universal mounting apparatus 61. The universal mounting apparatus 61 includes a front side 72 and a back side 73. The front side 72 faces outward when the universal mounting apparatus 61 is installed, while the back side 73 attaches to the substrate 65.

The distance between the front side 72 and the back side 73 defines a mounting depth 69 of the universal mounting apparatus 61. The mounting depth 69 is one inch or less, allowing the universal mounting apparatus 61 to be installed in spaces with limited clearance, such as under an obstruction. In another embodiment, the mounting depth 69 is three-quarters of an inch. In another embodiment, the mounting depth 69 is half an inch. In another example, the mounting depth 69 is less than one-eighth of the outer diameter 70. These novel relative dimensions ensure optimal functionality and structural integrity of the recessed lighting assembly while maintaining visual appeal.

Figure 12:
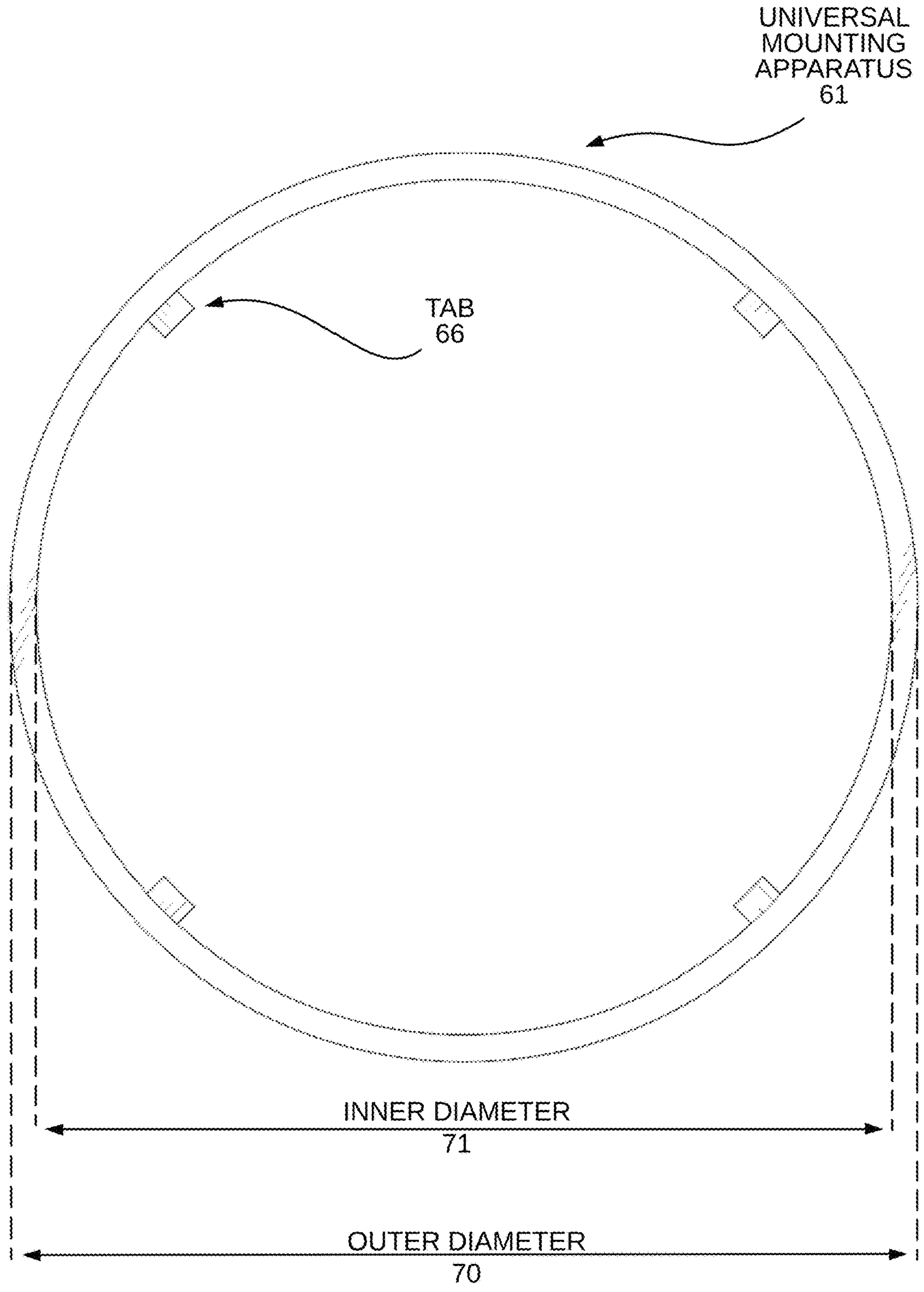
FIG. 12 is a diagram showing a front view of the universal mounting apparatus.

FIG. 12 is a diagram showing a front view of the universal mounting apparatus 61. The universal mounting apparatus 61 has an outer diameter 70 and an inner diameter 71.

Figure 13:
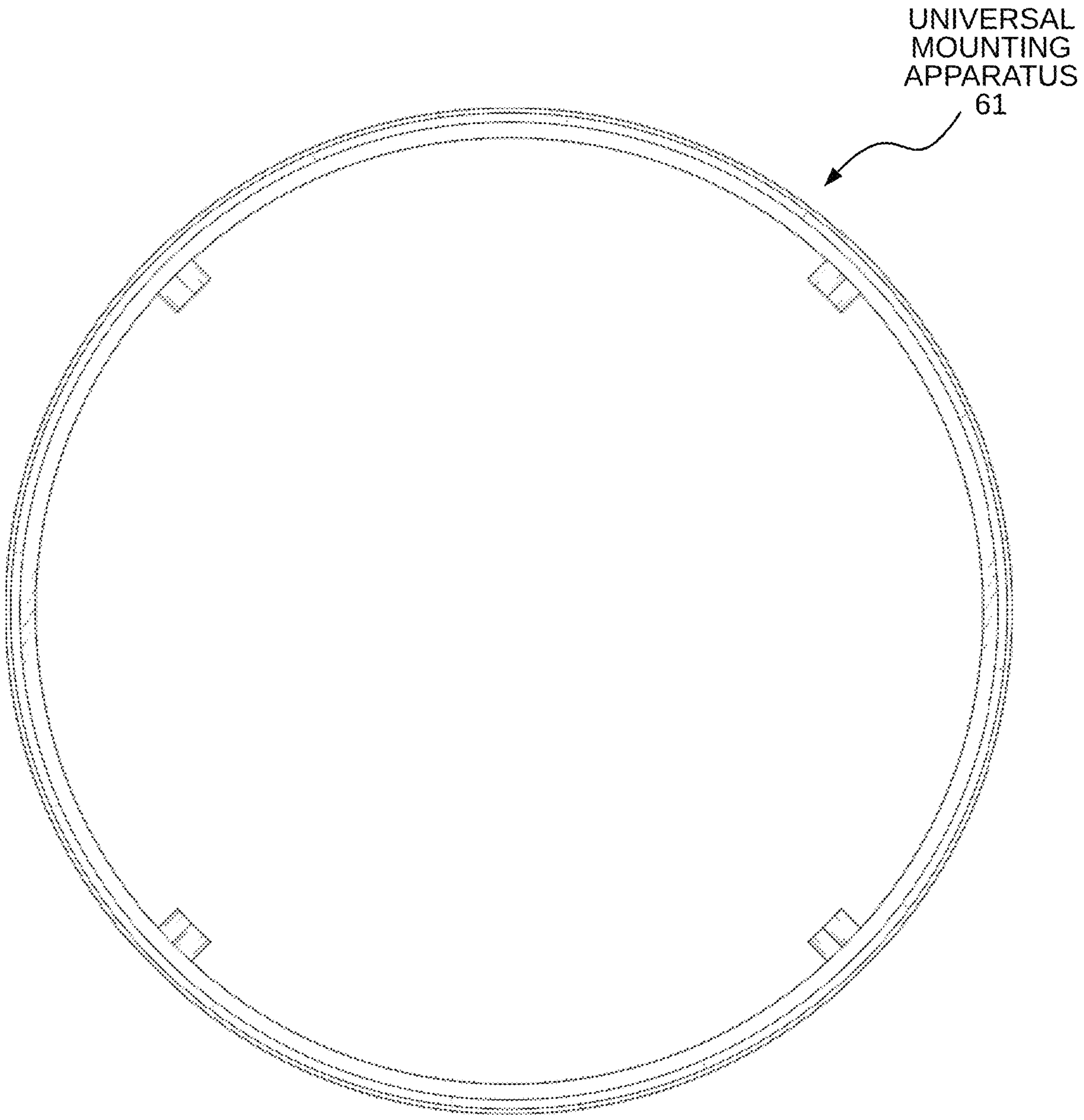
FIG. 13 is a diagram showing a back view of the universal mounting apparatus.

FIG. 13 is a diagram showing a back view of the universal mounting apparatus 61. The back view provides a clear illustration of the mounting body, which has the inner surface 67 and the outer surface 58. The inner surface 67 is configured to receive the light mounting apparatus 62. The outer surface 58 interfaces with the substrate 65 when installed.

The universal mounting apparatus 61 is designed to accommodate various installation scenarios. The back side 73 attaches directly to the substrate 65, providing a stable base for the recessed lighting assembly 60. The front side 72 is configured to provide a seamless integration with the surrounding substrate 65 surface.

The combination of the mounting holes 68 and the shallow mounting depth 69 allows the universal mounting apparatus 61 to be securely installed in a variety of substrates while maintaining a low profile. This design enables the recessed lighting assembly 60 to be mounted under an obstruction, providing flexibility in lighting placement and design.

Figure 14:
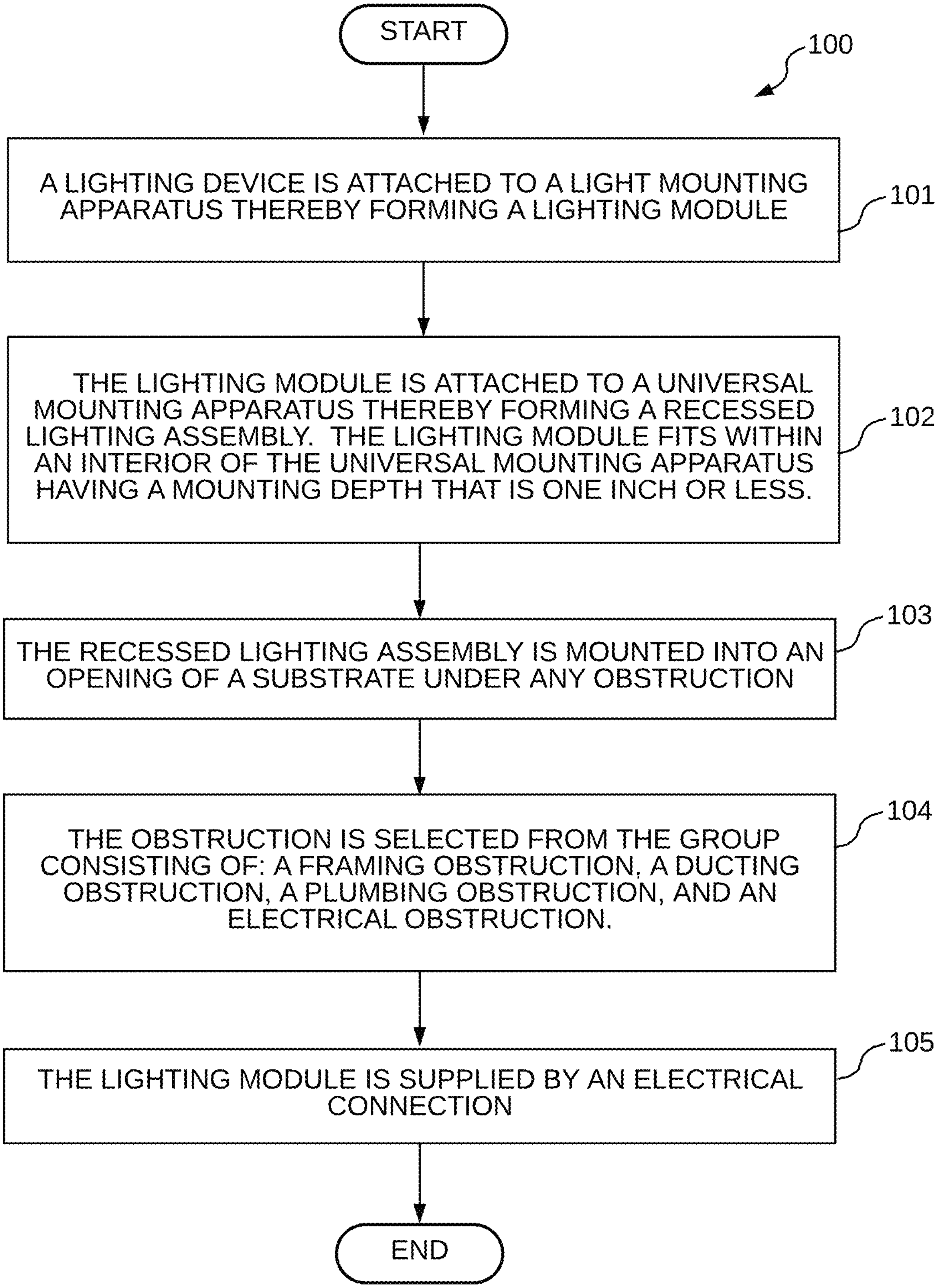
FIG. 14 is a flowchart of a method in accordance with another novel aspect.

FIG. 14 is a diagram showing a flowchart of a method 100 for installing and operating the recessed lighting assembly 60 in a substrate. The method 100 comprises a series of steps for assembling and mounting the recessed lighting assembly with a universal mounting apparatus.

In a first step (step 101), a lighting device is attached to a light mounting apparatus, forming a lighting module. This step involves securing the lighting device within the light mounting apparatus to create a single unit that can be easily installed and removed as needed.

In a second step (step 102), the lighting module is attached to a universal mounting apparatus, forming a recessed lighting assembly. During this step, the lighting module fits within an interior of the universal mounting apparatus. The universal mounting apparatus provides a stable base for the lighting module and interfaces with the surrounding substrate.

In a third step (step 103), the recessed lighting assembly is mounted into an opening of a substrate under any obstruction. This step involves positioning the recessed lighting assembly within a pre-cut opening in the substrate. The universal mounting apparatus has a mounting depth that is less than or equal to the thickness of the substrate, allowing for installation in spaces with limited clearance above the substrate surface.

In a fourth step (step 104), the recessed lighting assembly is mounted under an obstruction. The obstruction is selected from a group consisting of: a framing obstruction, a ducting obstruction, a plumbing obstruction, and an electrical obstruction. The shallow mounting depth of the universal mounting apparatus allows for installation in spaces with various types of obstructions, providing flexibility in lighting placement and design.

In a fifth step (step 105), the lighting module is supplied with power via an electrical connection. This step involves connecting the lighting device to a power source, enabling the recessed lighting assembly to function as intended.

The method 100 accommodates various installation applications. The universal mounting apparatus is designed to be mounted onto any substrate, such as wood, tile, metal, plastic, vent, register, or any suitable building structure capable of supporting the recessed lighting assembly. The mounting holes on the universal mounting apparatus allow for secure attachment to the substrate.

The universal mounting apparatus features tabs on its inner surface that interact with corresponding features on the light mounting apparatus, securing the light mounting apparatus within the universal mounting apparatus. This design ensures a stable and secure installation of the lighting module.

The front side of the universal mounting apparatus faces outward when installed, while the back side attaches to the substrate. The mounting depth between the front side and the back side is one inch or less, allowing for installation in spaces with limited clearance.

The method 100 enables the installation of the recessed lighting assembly in challenging spaces where traditional recessed lighting fixtures would not fit. By accommodating various obstructions and substrates, the method 100 provides a versatile solution for recessed lighting installation.

Figure 15:
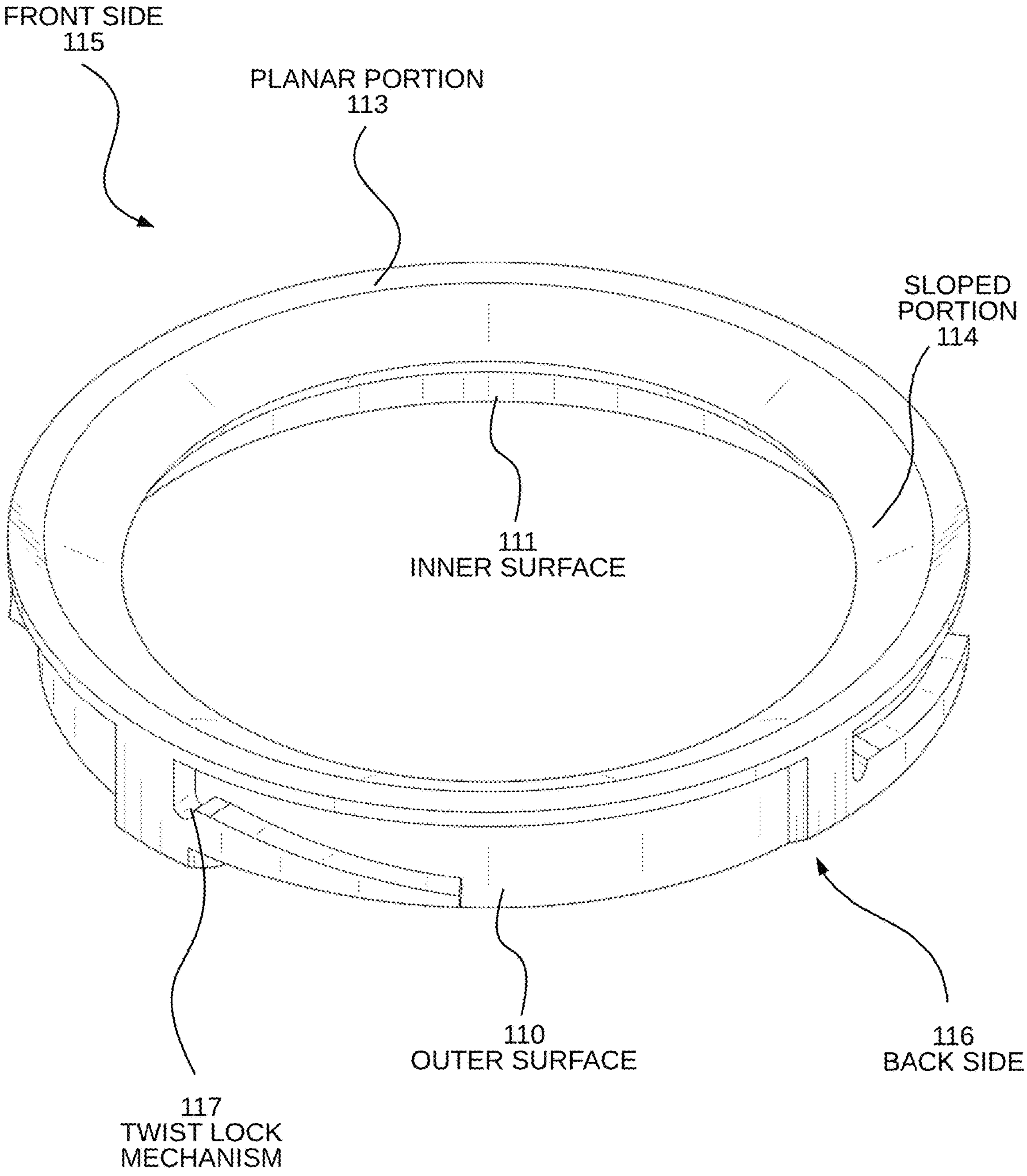
FIG. 15 is a diagram showing a perspective view of the front of a light mounting apparatus in accordance with one embodiment.

FIG. 15 is a diagram showing a perspective view of the light mounting apparatus 12. The light mounting apparatus 12 includes multiple surfaces and features designed for secure installation and optimal light distribution.

The light mounting apparatus 12 comprises an outer surface 110 and an inner surface 111. The outer surface 110 forms the uppermost visible edge of the light mounting apparatus 12, creating a circular rim. The inner surface 111 forms the interior wall of the light mounting apparatus 12. The outer surface 110 extends downward from the front side of the light mounting apparatus 12.

The front side 115 of the light mounting apparatus 12 includes a planar portion 113 and a sloped portion 114. The planar portion 113 forms the central area of the front side 115. The sloped portion 114 extends from the outer edge of the planar portion 113 towards the outer circumference of the light mounting apparatus 12. This design allows for optimal light distribution and integration with the surrounding surface when installed.

A back side 116 of the light mounting apparatus 12 is partially visible at the bottom of the housing in FIG. 15, indicating the depth of the structure. The back side 116 interfaces with the inner surface of the drywall mounting apparatus 11 or the universal mounting apparatus 61 when installed.

The outer surface 110 of the light mounting apparatus 12 features a twist lock mechanism 117. In one embodiment, the twist lock mechanism 117 consists of protruding tabs that engage with corresponding slots on the inner surface of the drywall mounting apparatus 11 or the universal mounting apparatus 61. In another embodiment, the twist lock mechanism 117 comprises a series of interlocking ridges that secure the light mounting apparatus 12 in place when twisted. In another embodiment, a magnet interface is used to attach the drywall mounting apparatus 11 or the universal mounting apparatus 61 to the light mounting apparatus 12.

Figure 16:
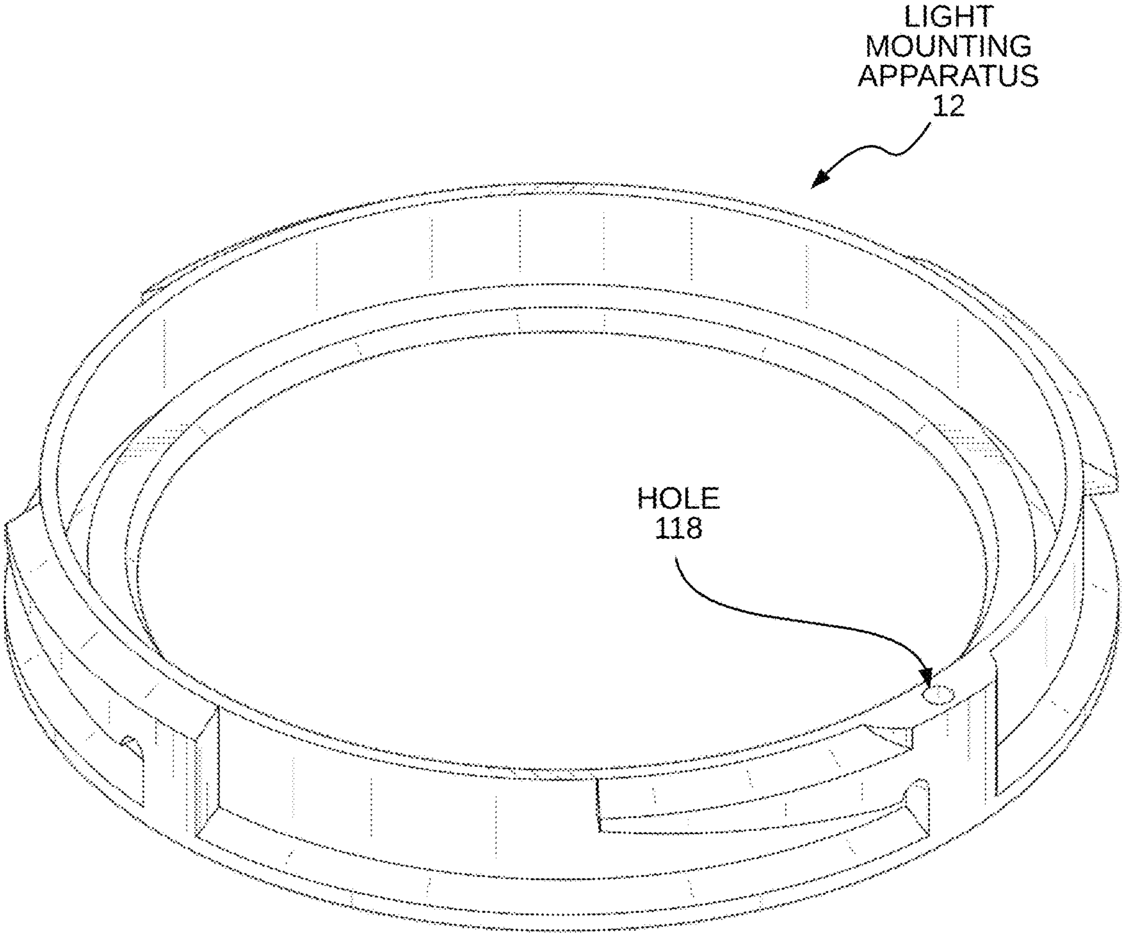
FIG. 16 is a diagram showing a perspective view of the back of the light mounting apparatus.

FIG. 16 is a diagram showing a perspective view of the back of the light mounting apparatus 12. The housing of the light mounting apparatus 12 forms the main body of the device. A hole 118 is visible on the inner surface 111 of the housing. In one embodiment, the hole 118 is used for securing the lighting device 13 to the light mounting apparatus 12. In another embodiment, the hole 118 serves as an access point for electrical connections.

Figure 17:
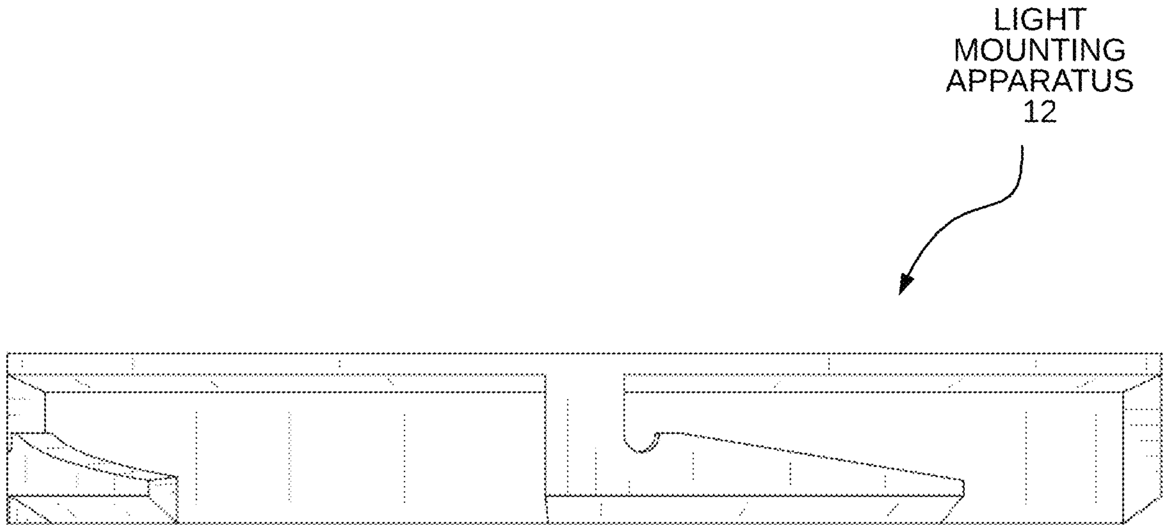
FIG. 17 is a diagram showing a side view of the light mounting apparatus.

FIG. 17 is a diagram showing a side view of the light mounting apparatus 12. This view clearly illustrates the profile of the light mounting apparatus 12, including the relationship between the planar portion 113 and the sloped portion 114 of the front side 115. The side view also demonstrates how the twist lock mechanism 117 protrudes from the outer surface 110.

Figure 18:
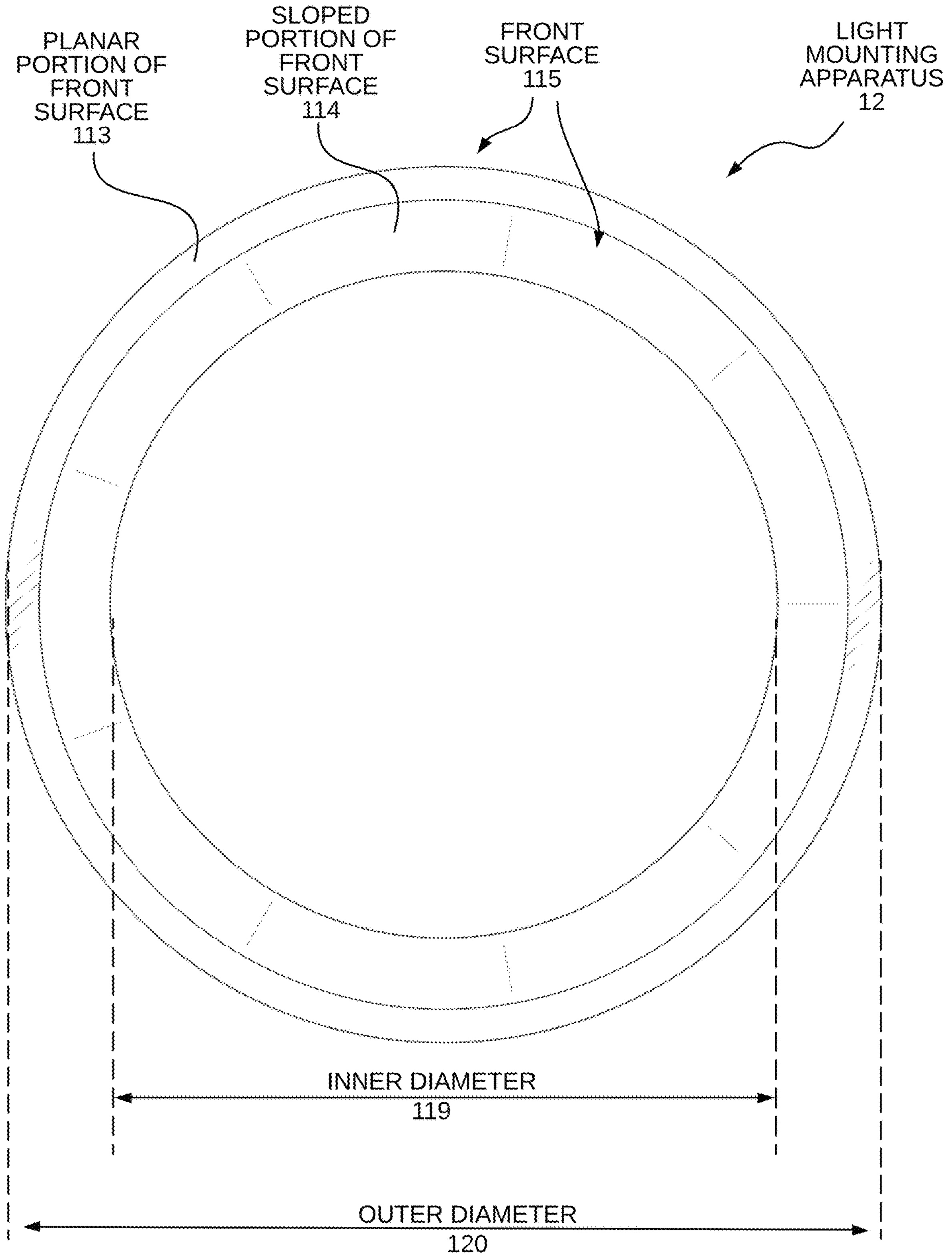
FIG. 18 is a diagram showing a front view of the light mounting apparatus.

FIG. 18 is a diagram showing a front view of the light mounting apparatus 12. This view provides a clear illustration of the circular design of the light mounting apparatus 12, including its inner diameter 119 and outer diameter 120. The inner diameter 119 defines the opening through which light from the lighting device 13 is emitted. The outer diameter 120 represents the full width of the light mounting apparatus 12, including the sloped portion 114.

Figure 19:
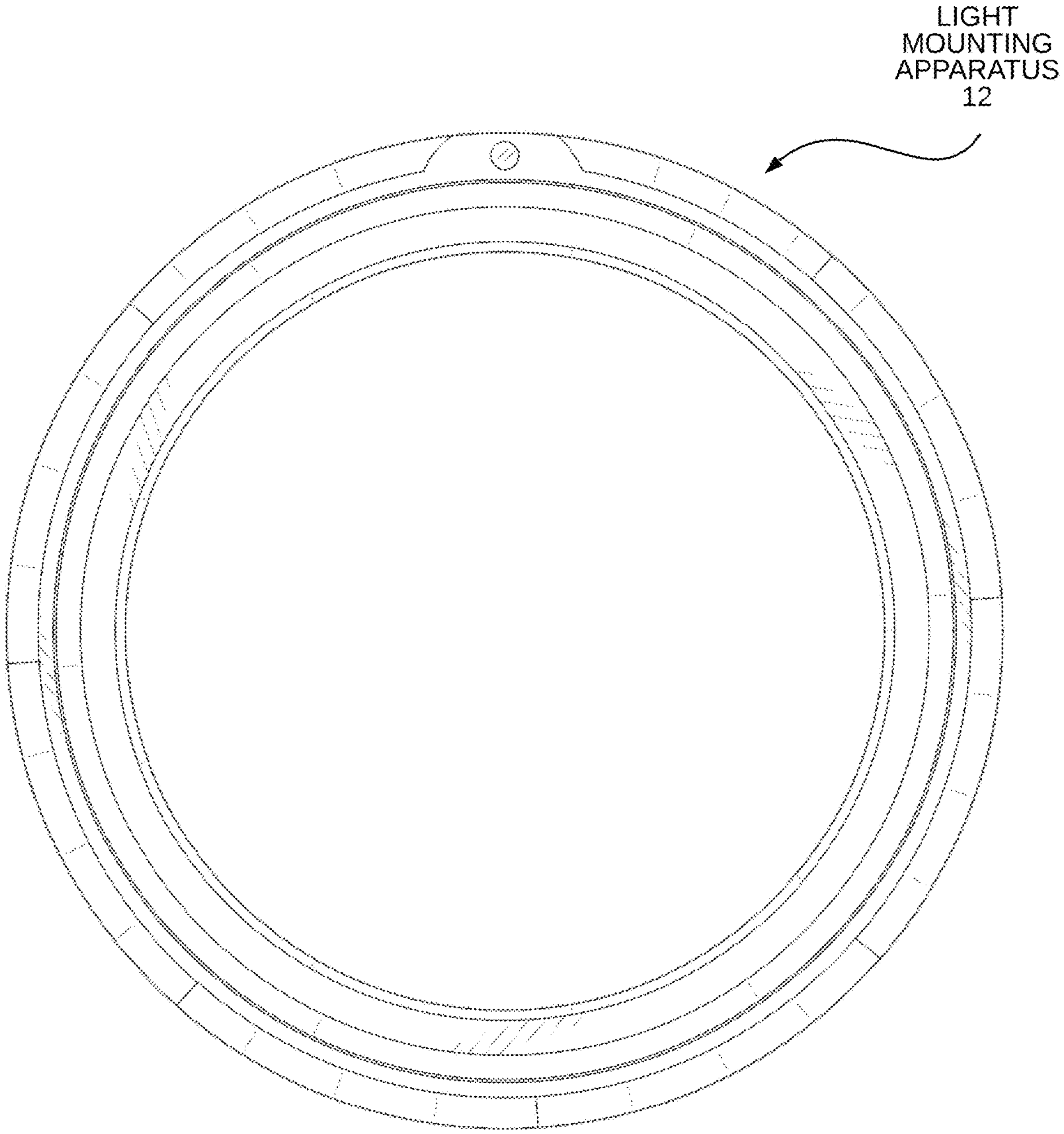
FIG. 19 is a diagram showing a back view of the light mounting apparatus.

FIG. 19 is a diagram showing a back view of the light mounting apparatus 12. This view provides additional detail on the structure of the back side 116, including the arrangement of any mounting features or electrical connection points.

The light mounting apparatus 12 is designed to fit securely within the drywall mounting apparatus 11 or the universal mounting apparatus 61. The twist lock mechanism 117 on the outer surface 110 of the light mounting apparatus 12 engages with tabs on the inner surface of the drywall mounting apparatus 11 or the universal mounting apparatus 61. This design allows for easy installation and removal of the light mounting apparatus 12 without the need for additional tools.

The combination of the planar portion 113 and the sloped portion 114 on the front side 115 of the light mounting apparatus 12 serves multiple purposes. In one embodiment, the planar portion 113 provides a flat surface for mounting the lighting device 13. In another embodiment, the planar portion 113 acts as a heat sink, dissipating heat generated by the lighting device 13. The sloped portion 114 aids in directing light and creating a smooth transition between the light mounting apparatus 12 and the surrounding surface when installed.

The hole 118 on the inner surface 111 of the light mounting apparatus 12 provides flexibility in securing the lighting device 13. In one embodiment, the hole 118 accommodates a screw for direct attachment of the lighting device 13. In another embodiment, the hole 118 allows for the passage of wires, facilitating electrical connections between the lighting device 13 and the power source.

The design of the light mounting apparatus 12, with its various surfaces and features, allows for secure installation, optimal light distribution, and easy maintenance of the recessed lighting assembly 10 or the recessed lighting assembly 60. The twist lock mechanism 117 ensures a stable connection with the drywall mounting apparatus 11 or the universal mounting apparatus 61, while the front side 115 design enhances both functionality and aesthetics of the installed lighting system.

Figure 20:
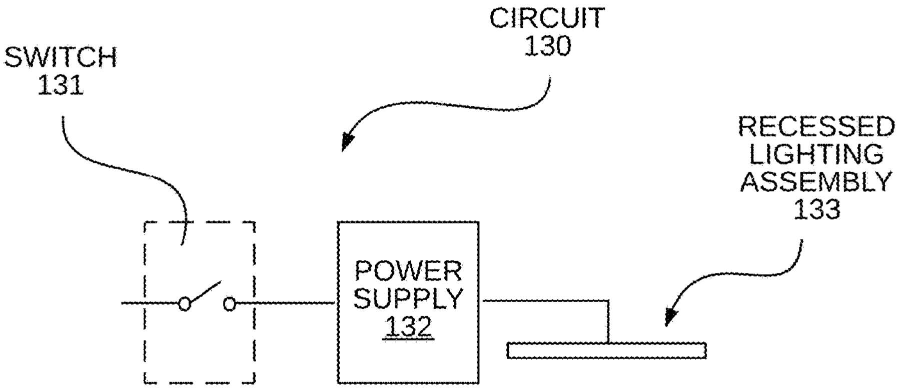
FIG. 20 is a diagram showing a circuit for a recessed lighting system in accordance with one embodiment.

FIG. 20 is a diagram showing a circuit 130 for powering and controlling a recessed lighting assembly 133 in accordance with one embodiment. The circuit 130 includes a switch 131 connected to a power supply 132. The power supply 132 is connected to the novel recessed lighting assembly 133. The switch 131 controls the flow of electrical power from the power supply 132 to the recessed lighting assembly 133. In one embodiment, the switch 131 is a simple on/off switch. In another embodiment, the switch 131 is a dimmer switch. In another embodiment, the switch 131 is a smart switch controllable via a mobile device or home automation system.

The power supply 132 provides electrical power to the recessed lighting assembly 133. The power supply 132 is any suitable power supply configured to supply the recessed lighting assembly 133. In one example, the power supply 132 includes a transformer to convert AC power to DC power suitable for LED lighting devices.

The recessed lighting assembly 133 includes any suitable lighting device that fits within the light mounting apparatus. In one embodiment, the lighting device is an LED module. In another embodiment, the lighting device is a halogen bulb. In another embodiment, the lighting device is a compact fluorescent lamp. In another embodiment, the lighting device is a solid-state lighting (SSL) device.

Figure 21:
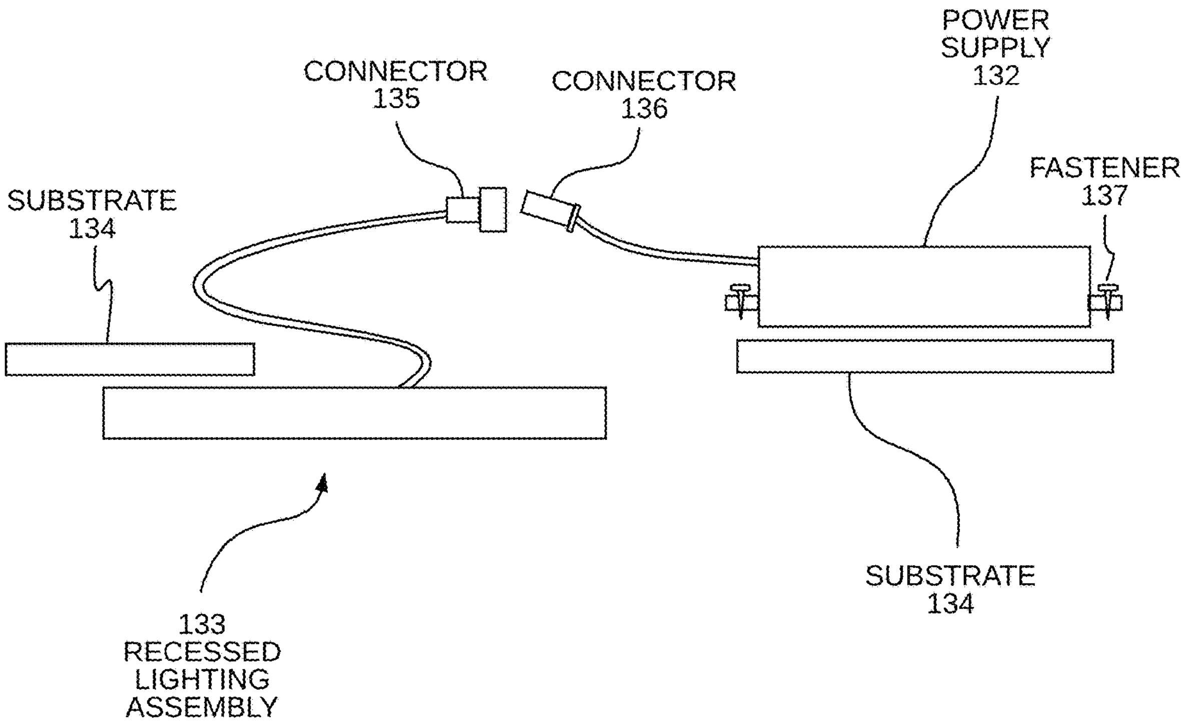
FIG. 21 is a diagram showing connection details for the recessed lighting system.

FIG. 21 is a diagram showing connection details of the recessed lighting assembly 133. The substrate 134 is any suitable material for mounting the recessed lighting assembly 133. In one embodiment, the substrate 134 is drywall. In another embodiment, the substrate 134 is a wood panel. In another embodiment, the substrate 134 is a tile surface. In another embodiment, the substrate 134 is a vent or register. In another embodiment, the substrate 134 is a wall.

A first connector 135 and a second connector 136 are used to establish an electrical connection between the power supply 132 and the recessed lighting assembly 133. In one embodiment, the first connector 135 is a male connector and the second connector 136 is a female connector. In another embodiment, the first connector 135 and the second connector 136 are quick-connect terminals. In another embodiment, the first connector 135 and the second connector 136 are screw terminals.

The first connector 135 and the second connector 136 allow for easy installation and removal of the recessed lighting apparatus 133 without the need to directly wire the apparatus. This design facilitates maintenance and replacement of the lighting device.

A fastener 137 is used to secure the recessed lighting apparatus 133 to the substrate 134. In one embodiment, the fastener 137 is a screw. In another embodiment, the fastener 137 is a clip. In another embodiment, the fastener 137 is an adhesive.

The recessed lighting apparatus 133 is designed to be installed under any obstruction without interfering with the electrical connection. The shallow mounting depth of the universal mounting apparatus or the drywall mounting apparatus allows for installation in spaces with limited clearance above the substrate 134 surface.

The circuit 130, including the switch 131 and the power supply 132, connects to the recessed lighting apparatus 133 through the first connector 135 and the second connector 136. This configuration allows for the lighting module to be supplied with power via an electrical connection while accommodating various obstructions that contact a surface of the substrate 134.

The design of the recessed lighting apparatus 133, along with the universal mounting apparatus or the drywall mounting apparatus, serves as a means for mounting the light mounting apparatus onto an opening of the substrate 134 under any obstruction. The mounting depth of the universal mounting apparatus or the drywall mounting apparatus is less than or equal to the thickness of the substrate 134, allowing for flush installation and accommodation of obstructions.

Figure 22:
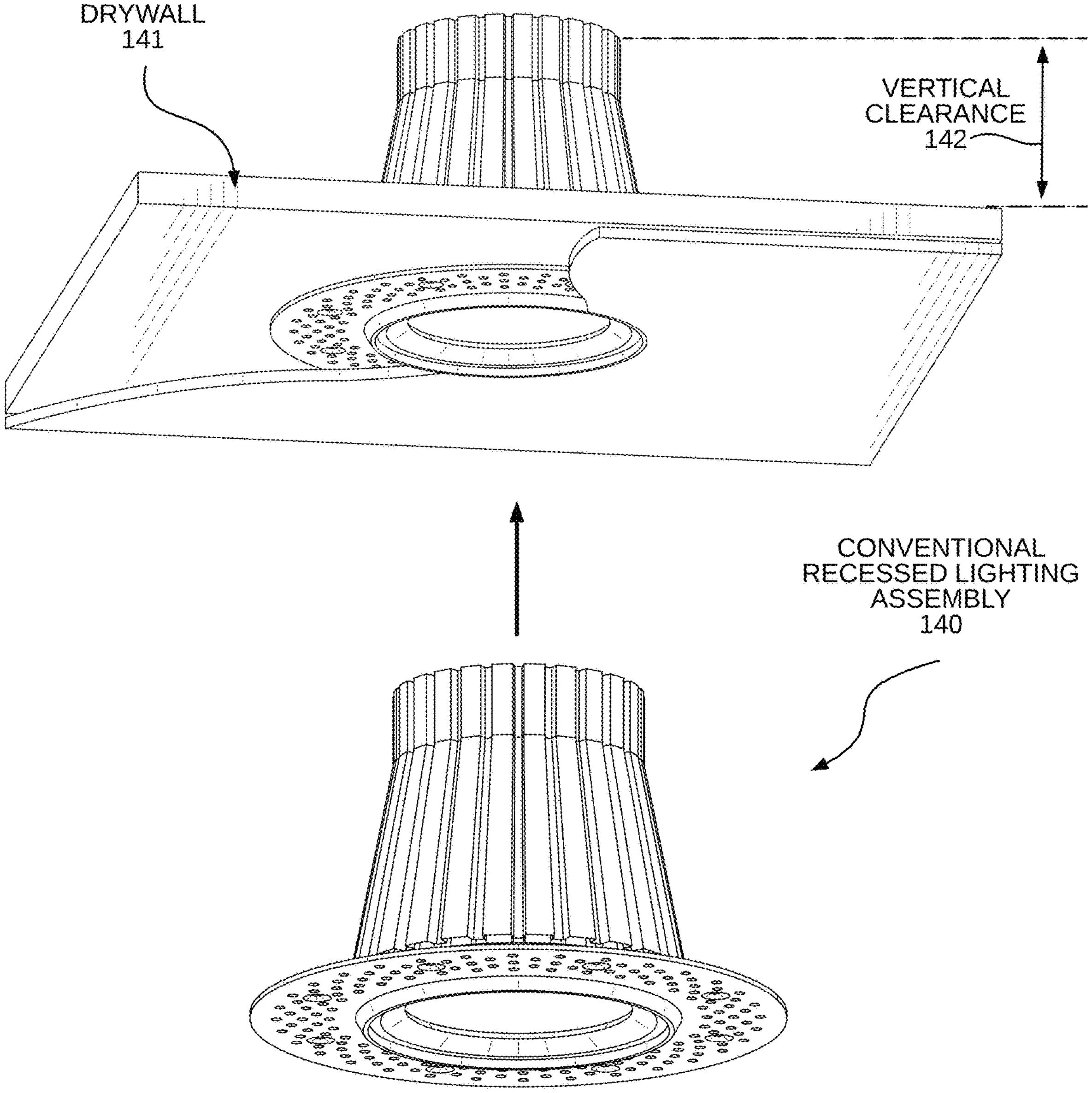
FIG. 22 is a diagram showing an exploded view of a conventional recessed lighting assembly and its installation in a drywall ceiling.

FIG. 22 is a diagram showing an exploded view of a conventional recessed lighting assembly 140 and its installation in a drywall ceiling 141. As shown in FIG. 22, a vertical clearance 142 is required to appropriately install the conventional recessed lighting assembly 140. The vertical clearance 142 extends beyond the back side of the drywall 141 surface. The vertical clearance 142 required to install the conventional recessed lighting assembly 140. Obstructions or other building features prevent limits where the conventional recessed lighting assembly 140 can be placed. The conventional recessed lighting assembly 140 does not provide the flexibility in layout and design that is afforded by the novel recessed lighting assemblies described, such as recessed lighting assembly 10 or 60 which can be installed along any surface.

Figure 23:
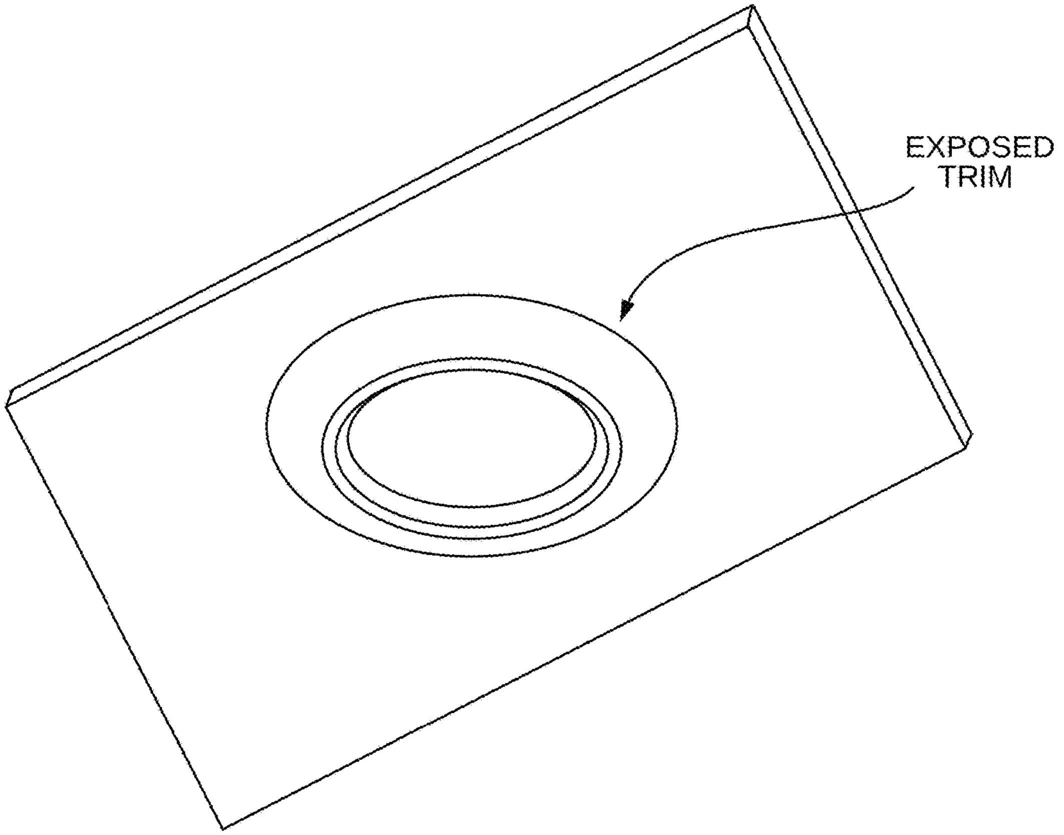
FIG. 23 is a diagram of a perspective view of another conventional recessed lighting assembly with trim.

FIG. 23 is a diagram of a perspective view of another conventional recessed lighting assembly with trim. As shown in FIG. 23, the trim is exposed on the substrate. In one embodiment, no trim is exposed on the substrate after installation of novel recessed lighting assemblies, such as recessed lighting assembly 10 and recessed lighting assembly 60. In various embodiments, press fit attachments, fasteners, magnets, adhesives, or other mechanisms are employed to secure the novel recessed lighting assemblies within substrate openings without exposing trim. By avoiding trim, the substrate surface is easier to finish and to maintain. In addition, the novel recessed lighting assemblies yield better light distribution and heat dissipation by omitting trim portions as is typically found in commercially available recessed lighting assemblies.

Figure 24:
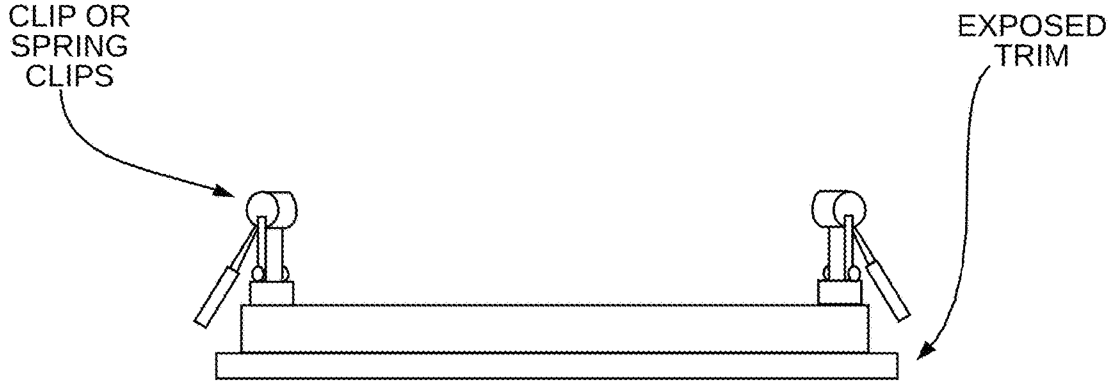
FIG. 24 is a diagram of a perspective view of another conventional recessed lighting assembly with a clip mechanism.

FIG. 24 is a diagram of a perspective view of another conventional recessed lighting assembly with a clip mechanism. A clip or spring clip mechanism is involved in mounting the conventional recessed lighting assembly shown in FIG. 24. In one embodiment, no clip or spring clip mechanism is involved in installation of novel recessed lighting assemblies, such as recessed lighting assembly 10 and recessed lighting assembly 60. Neither recessed lighting assembly 10 nor recessed lighting assembly 60 includes a clip or spring clip as is found in typical commercially available recessed lighting assemblies. By avoiding clip or spring clip mechanisms, the novel recessed lighting assemblies ensure that no portion extends beyond the substrate thickness allowing for installation under any surface regardless of potential obstructions.

In addition, the novel recessed lighting assemblies cost less to assemble and manufacture than conventional lighting assemblies due to having less components and material types. For example, in various embodiments, the novel recessed lighting assemblies are manufactured via injection molding, three dimensional (3D) printing, or other scalable manufacturing techniques. The novel recessed lighting assemblies have no metal components, except for the lighting modules.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A recessed lighting assembly comprising:

a drywall mounting apparatus having a mounting flange and a mounting body, wherein the mounting body has a mounting depth that is one inch or less, and wherein the drywall mounting apparatus is mountable under any obstruction; and a light mounting apparatus, wherein the mounting body has an inner surface and an outer surface, wherein the inner surface is configured to receive the light mounting apparatus, wherein the light mounting apparatus has an inner surface and an outer surface, wherein the outer surface of the light mounting apparatus has a twist lock mechanism that engages tabs on the inner surface of the mounting body, and wherein the light mounting apparatus has a front surface having a planar portion and a sloped portion.

2. The recessed lighting assembly of claim 1, further comprising:

a lighting device, wherein the lighting device is configured to fit into the light mounting apparatus.

3. The recessed lighting assembly of claim 2, wherein the lighting device and the light mounting apparatus form a lighting module.

4. The recessed lighting assembly claim 1, wherein the obstruction is selected from the group consisting of: a framing obstruction, a ducting obstruction, a plumbing obstruction, and an electrical obstruction.

5. The recessed lighting assembly of claim 1, wherein the mounting flange has an outer diameter and an inner diameter, and wherein one or more mud bonding perforations and mounting holes are present between the outer diameter and the inner diameter.

6. The recessed lighting assembly of claim 1, wherein the mounting flange has a back surface that attaches to drywall and a front surface that receives drywall mud.

7. A method comprising:

attaching a lighting device to a light mounting apparatus thereby forming a lighting module;

attaching the lighting module to a drywall mounting apparatus thereby forming a recessed lighting assembly, wherein the lighting module fits within an interior of the drywall mounting apparatus; and mounting the recessed lighting assembly into an opening of a substrate under any obstruction, wherein the substrate has a thickness, and wherein the drywall mounting apparatus has a mounting depth that is less than or equal to the thickness of the substrate, wherein the obstruction contacts a surface of the substrate, and wherein the obstruction is selected from the group consisting of: a framing obstruction, a ducting obstruction, a plumbing obstruction, and an electrical obstruction.

8. The method of claim 7, further comprising:

supplying the lighting module via an electrical connection.

9. The method of claim 8, wherein the obstruction does not interfere with the electrical connection to the lighting module.

10. The method of claim 7, wherein the drywall mounting apparatus has a mounting flange and a mounting body.

11. The method of claim 10, wherein the mounting flange has an outer diameter and an inner diameter, and wherein one or more mud bonding perforations and mounting holes are present between the outer diameter and the inner diameter.

12. The method of claim 10, further comprising:

applying drywall mud to a front surface of the mounting flange, wherein no trim is exposed on the substrate or drywall mud, and wherein no clip or spring mechanism is involved in mounting to the substrate.

13. The method of claim 10, wherein the mounting body has an inner surface and an outer surface, and wherein the inner surface is configured to receive the light mounting apparatus.

14. A method comprising:

attaching a lighting device to a light mounting apparatus thereby forming a lighting module;

attaching the lighting module to a drywall mounting apparatus thereby forming a recessed lighting assembly, wherein the lighting module fits within an interior of the drywall mounting apparatus; and mounting the recessed lighting assembly into an opening of a substrate under any obstruction, wherein the substrate has a thickness, wherein the drywall mounting apparatus has a mounting depth that is less than or equal to the thickness of the substrate, wherein the drywall mounting apparatus has a mounting flange and a mounting body, wherein the light mounting apparatus has an inner surface and an outer surface, and wherein the outer surface of the light mounting apparatus has a twist lock mechanism that attaches to an inner surface of the mounting body.

* * * * *